US010924895B2

(12) United States Patent
Buckley et al.

(10) Patent No.: US 10,924,895 B2
(45) Date of Patent: Feb. 16, 2021

(54) ENHANCING SHORT MESSAGE SERVICE ADDRESSING AND ROUTING

(71) Applicant: BlackBerry Limited, Waterloo (CA)

(72) Inventors: Adrian Buckley, Tracy, CA (US); Nicholas James Russell, Newbury (GB)

(73) Assignee: BlackBerry Limited, Waterloo (CA)

( * ) Notice: Subject to any disclaimer, the term of this patent is extended or adjusted under 35 U.S.C. 154(b) by 333 days.

(21) Appl. No.: 13/747,207

(22) Filed: Jan. 22, 2013

(65) Prior Publication Data

US 2014/0206403 A1    Jul. 24, 2014

(51) Int. Cl.
*H04W 4/14*     (2009.01)
*H04L 29/06*    (2006.01)
*H04L 29/12*    (2006.01)
*H04W 80/08*    (2009.01)

(52) U.S. Cl.
CPC .............. *H04W 4/14* (2013.01); *H04L 61/106* (2013.01); *H04L 69/24* (2013.01); *H04L 61/305* (2013.01); *H04L 61/6054* (2013.01); *H04L 69/18* (2013.01); *H04W 80/085* (2013.01)

(58) Field of Classification Search
CPC ....... H04W 4/14; H04W 88/184; H04W 4/12; H04W 80/085; H04L 51/066; H04L 51/38; H04L 61/106; H04L 61/305; H04L 61/6054; H04L 69/18; H04L 69/24
USPC ......................................................... 455/466
See application file for complete search history.

(56) References Cited

U.S. PATENT DOCUMENTS

| | | | |
|---|---|---|---|
| 6,597,917 B1 | 7/2003 | Meuronen | |
| 7,532,890 B2 | 5/2009 | Davies et al. | |
| 2003/0123419 A1* | 7/2003 | Rangnekar | H04L 45/02 370/338 |
| 2003/0214970 A1 | 11/2003 | Pimentel | |
| 2004/0008723 A1 | 1/2004 | Uchida et al. | |
| 2005/0197017 A1* | 9/2005 | Chou et al. | 439/660 |
| 2006/0217072 A1 | 9/2006 | Poyhonen et al. | |
| 2007/0127066 A1* | 6/2007 | Haba | H04N 1/00347 358/1.15 |
| 2007/0150604 A1* | 6/2007 | Batteram | 709/228 |
| 2008/0090597 A1 | 4/2008 | Celik et al. | |
| 2008/0273485 A1* | 11/2008 | Tsigler | H04W 92/12 370/328 |

(Continued)

FOREIGN PATENT DOCUMENTS

| | | |
|---|---|---|
| EP | 2421197 A1 | 2/2012 |
| WO | 2010127508 A1 | 11/2010 |

OTHER PUBLICATIONS

Notice of Allowance dated Dec. 20, 2013; U.S. Appl. No. 13/204,124, filed Aug. 5, 2011; 9 pages.

(Continued)

*Primary Examiner* — Lester G Kincaid
*Assistant Examiner* — Dung L Lam
(74) *Attorney, Agent, or Firm* — Conley Rose, P.C.; J. Robert Brown, Jr.; Albert A. Abbou

(57) ABSTRACT

A method for sending a short message service (SMS) message is provided. The method comprises receiving, by a destination home network database entity from a sending network entity, a first message containing an indication of support for a plurality of SMS message delivery protocols, wherein the SMS message is transmitted to a target entity address contained in the first message.

21 Claims, 24 Drawing Sheets

(56) References Cited

U.S. PATENT DOCUMENTS

| | | | |
|---|---|---|---|
| 2009/0129372 A1* | 5/2009 | Pandey | G06Q 30/0267 370/352 |
| 2009/0239556 A1* | 9/2009 | Sennett | H04W 4/14 455/466 |
| 2010/0093382 A1 | 4/2010 | Samaha | |
| 2010/0222091 A1 | 9/2010 | Shaheen | |
| 2011/0130158 A1 | 6/2011 | Celik et al. | |
| 2011/0143784 A1 | 6/2011 | Ahluwalia | |
| 2011/0165860 A1 | 7/2011 | Cai et al. | |
| 2011/0165895 A1 | 7/2011 | Ryan | |
| 2011/0299540 A1* | 12/2011 | Chen et al. | 370/401 |
| 2012/0110145 A1 | 5/2012 | Pinheiro et al. | |
| 2012/0117178 A1 | 5/2012 | Price et al. | |
| 2012/0134351 A1 | 5/2012 | Ewert et al. | |
| 2012/0165052 A1* | 6/2012 | Sennett et al. | 455/466 |
| 2012/0302268 A1* | 11/2012 | Casto | H04W 4/14 455/466 |
| 2013/0303107 A1* | 11/2013 | Mitchell et al. | 455/404.2 |

OTHER PUBLICATIONS

PCT Written Opinion of the International Preliminary Examining Authority; Application No. PCT/EP2012/065155; dated Nov. 25, 2013; 6 pages.
PCT International Preliminary Report on Patentability; Application No. PCT/EP2012/065155; dated Jan. 21, 2014; 13 pages.
Russell, Nicholas James; U.S. Appl. No. 13/204,124, filed Aug. 5, 2011; Title: Character Enablement in Short Message Service.
ISO/IEC International Standard; "Information Technology—Universal Coded Character Set (UCS)"; ISO/IEC 10646; Second Edition; 2010; 130 pages.
ISO/IEC International Standard; "Information Technology—Universal Coded Character Set (UCS)"; ISO/IEC 10646; Third Edition; 2012; 142 pages.
ITU-T; "Series E: Overall Network Operation, Telephone Service, Service Operation and Human Factors, International Operation—Numbering Plan of the International Telephone Service, The International Public Telecommunication Numbering Plan"; E.164; Nov. 2010; 32 pages.
SMPP Developers Forum; Short Message Peer to Peer Protocol Specification V3.4; Issue 1.2; Oct. 12, 1999; 169 pages.
Crocker, David H.; "Standard for the Format of ARPA Internet Text Messages"; RFC #822; Aug. 13, 1982; 49 pages.
Moore, K.; "MIME (Multipurpose Internet Mail Extensions) Part Three: Message Header Extensions for Non-ASCII Text"; RFC 2047; Nov. 1996; 15 pages.
Freed, N., et al.; "MIME Parameter Value and Encoded Word Extensions: Character Sets, Languages, and Continuations"; RFC 2184; Aug. 1997; 10 pages.
Freed, N., et al.; "MIME Parameter Value and Encoded Word Extensions: Character Sets, Languages, and Continuations"; RFC 2231; Nov. 1997; 11 pages.
Eidnes, H., et al.; "Classless IN-ADDR.ARPA Delegation"; RFC 2317; Mar. 1998; 10 pages.
Rigney, C., et al.; "Remote Authentication Dial in User Service (RADIUS)"; RFC 2865; Jun. 2000; 76 pages.
Rigney, C.; "RADIUS Accounting"; RFC 2866; Jun. 2000; 28 pages.
Rosenberg, J., et al.; "SIP: Session Initiation Protocol"; RFC 3261; Jun. 2002; 252 pages.
Campbell, B., et al.; "Session Initiation Protocol (SIP) Extension for Instant Messaging"; RFC 3428; Dec. 2002; 17 pages.
Garcia-Martin, M., et al.; "Private Header (P-Header) Extensions to the Session Initiation Protocol (SIP) for the 3rd-Generation Partnership Project (3GPP)"; RFC 3455; Jan. 2003; 34 pages.
Calhoun, P.; "Diameter Base Protocol"; RFC 3588; Sep. 2003; 147 pages.
Loughney, J.; "Diameter Command Codes for Third Generation Partnership Project (3GPP) Release 5"; RFC 3589; Sep. 2003; 5 pages.
Thomson, S., et al.; "DNS Extensions to Support IP Version 6"; RFC 3596; Oct. 2003; 8 pages.
Calhoun, P., et al.; "Diameter Network Access Server Application"; RFC 4005; Aug. 2005; 85 pages.
Aboba, B., et al.; "The Network Access Identifier"; RFC 4282; Dec. 2005; 16 pages.
Jennings, C., et al.; "Session Initiation Protocol (SIP) URIs for Applications Such as Voicemail and Interactive Voice Response (IVR)"; RFC 4458; Apr. 2006; 20 pages.
Garcia-Martin, M., et al.; "Diameter Session Initiation Protocol (SIP) Application"; RFC 4740; Nov. 2006; 72 pages.
3GPP2; 3rd Generation Partnership Project 2; "Short Message Service over IMS"; 3GPP2 X.S0048-0; Version 1.0; Nov. 2007; 54 pages.
3GPP2; 3rd Generation Partnership Project 2; "Mobile Application Part (MAP)—SMS"; 3GPP2 X.S0004-641-E; Version 2.0; Jul. 2007; 59 pages.
3GPP TR 22.988 V1.0.0; 3rd Generation Partnership Project; Technical Specification Group Services and System Aspects; Study on Alternatives to E.164 for Machine-Type Communications; Release 10; Sep. 2010; 20 pages.
3GPP TS 23.003 V11.0.0; 3rd Generation Partnership Project; Technical Specification Group Core Network and Terminals; Numbering, Addressing and Identification; Release 11; Dec. 2011; 81 pages.
3GPP TS 23.038 V10.0.0; 3rd Generation Partnership Project; Technical Specification Group Core Network and Terminals; Alphabets and Language-Specific Information; Release 10; Mar. 2011; 56 pages.
3GPP TS 23.040 V10.0.0; 3rd Generation Partnership Project; Technical Specification Group Core Network and Terminals; Technical Realization of the Short Message Service (SMS); Release 10; Mar. 2011; 202 pages.
3GPP TS 23.040 V11.0.0; 3rd Generation Partnership Project; Technical Specification Group Core Network and Terminals; Technical Realization of the Short Message Service (SMS); Release 11; Dec. 2011; 202 pages.
3GPP TS 23.078 V11.1.0; 3rd Generation Partnership Project; Technical Specification Group Core Network and Terminals; Customised Applications for Mobile Network Enhanced Logic (CAMEL) Phase 4; Stage 2; Release 11; Dec. 2011; 748 pages.
3GPP TS 23.204 V11.1.0; 3rd Generation Partnership Project; Technical Specification Group Services and System Aspects; Support of Short Message Service (SMS) Over Generic 3GPP Internet Protocol (IP) Access; Stage 2; Release 11; Sep. 2011; 53 pages.
3GPP TR 23.863 V1.0.0; 3rd Generation Partnership Project; Technical Specification Group Services and System Aspects; Support of Short Message Service (SMS) in IMS Without MSISDN; Stage 2; Release 11; Dec. 2011; 56 pages.
3GPP TS 24.008 V10.3.0; 3rd Generation Partnership Project; Technical Specification Group Core Network and Terminals; Mobile Radio Interface Layer 3 Specification; Core Network Protocols; Stage 3; Release 10; Jun. 2011; 384 pages.
3GPP TS 24.008 V11.1.0; 3rd Generation Partnership Project; Technical Specification Group Core Network and Terminals; Mobile Radio Interface Layer 3 Specification; Core Network Protocols; Stage 3; Release 11; Dec. 2011; 654 pages.
3GPP TS 24.011 V10.0.0; 3rd Generation Partnership Project; Technical Specification Group Core Network and Terminals; Point-to-Point (PP) Short Message Service (SMS) Support on Mobile Radio Interface; Release 10; Feb. 2011; 108 pages.
3GPP TS 24.301 V10.3.0; 3rd Generation Partnership Project; Technical Specification Group Core Network and Terminals; Non-Access-Stratum (NAS) Protocol for Evolved Packet System (EPS); Stage 3; Release 10; Jun. 2011; 316 pages.
3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.
3GPP TS 24.341 V11.0.0; 3rd Generation Partnership Project; Technical Specification Group Core Network and Terminals; Support of SMS Over IP Networks; Stage 3; Release 11; Sep. 2011; 30 pages.

(56) References Cited

OTHER PUBLICATIONS

3GPP TS 29.002 V10.3.0; 3rd Generation Partnership Project; Technical Specification Group Core Network and Terminals; Mobile Application Part (MAP) Specification; Release 10; Jun. 2011; 952 pages.
3GPP TS 29.002 V11.1.0; 3rd Generation Partnership Project; Technical Specification Group Core Network and Terminals; Mobile Application Part (MAP) Specification; Release 11; Dec. 2011; 954 pages.
3GPP TS 29.078 V11.1.0; 3rd Generation Partnership Project; Technical Specification Group Core Network and Terminals; Customised Applications for Mobile Network Enhanced Logic (CAMEL) Phase 4; CAMEL Application Part (CAP) Specification; Release 11; Dec. 2011; 221 pages.
3GPP TS 29.172 V10.1.0; 3rd Generation Partnership Project; Technical Specification Group Core Network and Terminals; Location Services (LCS); Evolved Packet Core (EPC) LCS Protocol (ELP) Between the Gateway Mobile Location Centre (GMLC) and the Mobile Management Entity (MME); SLg Interface; Release 10; Sep. 2011; 25 pages.
3GPP TS 29.228 V11.2.0; 3rd Generation Partnership Project; Technical Specification Group Core Network and Terminals; IP Multimedia (IM) Subsystem Cx and Dx Interfaces; Signalling Flows and Message Contents; Release 11; Dec. 2011; 71 pages.
3GPP TS 29.229 V11.0.0; 3rd Generation Partnership Project; Technical Specification Group Core Network and Terminals; Cx and Dx Interfaces Based on the Diameter Protocol; Protocol Details; Release 11; Dec. 2011; 37 pages.
3GPP TS 29.272 V11.1.0; 3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol; Release 11; Dec. 2011; 98 pages.
3GPP TS 29.329 V11.1.0; 3rd Generation Partnership Project; Technical Specification Group Core Network and Terminals; Sh Interface Based on the Diameter Protocol; Protocol Details; Release 11; Dec. 2011; 22 pages.
3GPP TS 29.336 V11.1.0; 3rd Generation Partnership Project; Technical Specification Group Core Network and Terminals; Home Subscriber Server (HSS) Diameter Interfaces for Interworking with Packet Data Networks and Applications; Release 11; Dec. 2012; 21 pages.
3GPP TS 29.338 V11.0.0; 3rd Generation Partnership Project; Technical Specification Group Core Network and Terminals; Diameter Based Protocols to Support Short Message Service (SMS) Capable Mobile Management Entities (MMEs); Release 11; Dec. 2012; 40 pages.
3GPP TS 33.204 V10.0.0; 3rd Generation Partnership Project; Technical Specification Group Core Services and System Aspects; 3G Security; Network Domain Security (NDS); Transaction Capabilities Application Part (TCAP) User Security; Release 10; Mar. 2011; 24 pages.
Office Action dated Dec. 5, 2012; U.S. Appl. No. 13/204,124, filed Aug. 5, 2011; 10 pages.
Final Office Action dated Jul. 25, 2013; U.S. Appl. No. 13/204,124, filed Aug. 5, 2011; 17 pages.
Advisory Action dated Oct. 10, 2013; U.S. Appl. No. 13/204,124, filed Aug. 5, 2011; 3 pages.
PCT International Search Report; Application No. PCT/US2014/012548; dated Jul. 18, 2014; 4 pages.
PCT Written Opinion of the International Searching Authority; Application No. PCT/US2014/012548; dated Jul. 18, 2014; 7 pages.
PCT International Search Report; Application No. PCT/EP2012/065155; dated Jan. 8, 2013; 6 pages.
PCT Written Opinion of the International Searching Authority; Application No. PCT/EP2012/065155; dated Jan. 8, 2013; 10 pages.
Canadian Office Action; Application No. 2,843,917; dated Apr. 16, 2015; 4 pages.
Chinese Office Action as Received in Co-pending Application No. 201280048443.7 dated Nov. 3, 2015; 6 pages. (No English translation available).
European Extended Search Report; Application No. 14743042.5; dated Aug. 4, 2016; 6 pages.
European Examination Report; Application No. 14743042.5; dated Jul. 12, 2017; 5 pages.
European Examination Report; Application No. 12751018.8; dated Feb. 23, 2018; 10 pages.
European Examination Report; Application No. 12751018.8; dated Feb. 19, 2019; 3 pages.
European Summons to Attend Oral Proceedings; Application No. 12751018.8; dated Jul. 1, 2019; 7 pages.
Canadian Office Action; Application No. 2,843,917; dated Apr. 7, 2016; 4 pages.
Chinese Office Action as Received in Co-pending Application No. 201280048443.7 dated Mar. 31, 2016; 3 pages. (No English translation available).

\* cited by examiner

Example #5

9.1.2.5    Address fields

Address fields used by SM-RL are specified in 3GPP TS 24.011 [13] and 3GPP TS 29.002 [15].

Each address field of the SM-TL consists of the following sub-fields: An Address-Length field of one octet, a Type-of-Address field of one octet, and one Address-Value field of variable length; as shown below:

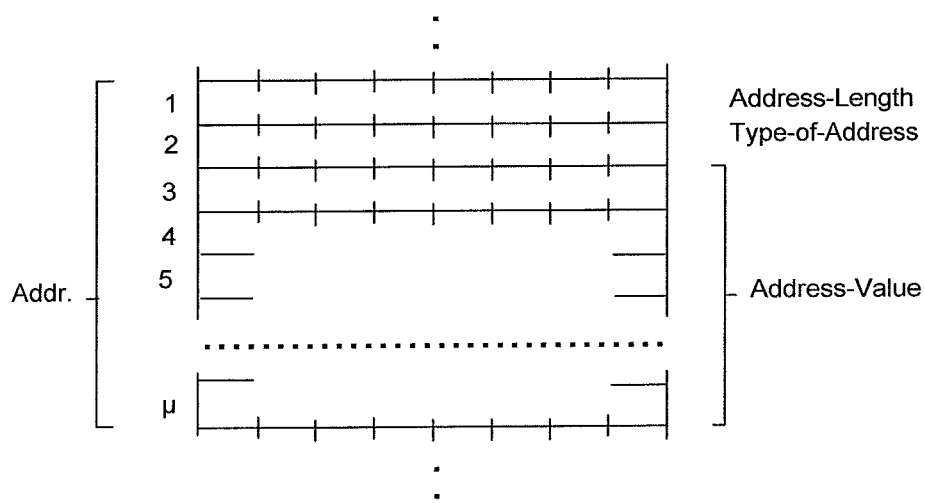

The Address-Length field is an integer representation of the number of useful semi-octets within the Address-Value field, i.e. excludes any semi octet containing only fill bits.

The Type-of-Address field format is as follows for ToN values 000-110:

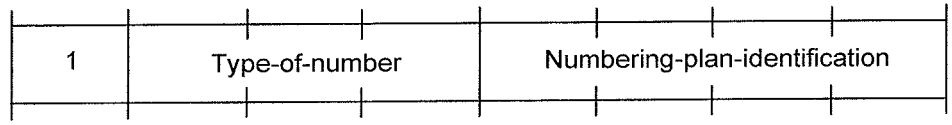

The Type-of-Address field format is as follows for ToN value 111:

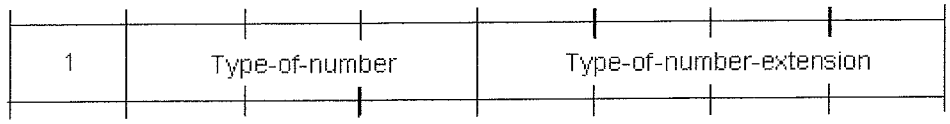

Figure 2

Type-of-number:

Bits  6 5 4

0 0 0      Unknown [1]

0 0 1      International number [2]

0 1 0      National number [3]

0 1 1      Network specific number [4]

1 0 0      Subscriber number [5]

1 0 1      Alphanumeric, (coded according to 3GPP TS 23.038 [9] GSM 7-bit default alphabet)

1 1 0      Abbreviated number 1 1 1      ~~Reserved for extension~~ Extended value used (refer to the Type-of-Number-Extension Table)

Type-of-number-Extension:

Bits  3 2 1 0

0 0 0 0      URI (coded according to UCS2)
        0 0 0 1      NAI (coded according to UCS2)
        0 0 1 0      IPv4 address (coded according to UCS2)
        0 0 1 1      IPv6 address (coded according to UCS2)
        0 1 0 0      FQDN (coded according to UCS2)
        1 1 1 1      Reserved for extension
        All other values are reserved.

The MS shall interpret reserved values as "Unknown" but shall store them exactly as received.

The SC may reject messages with a type of number containing a reserved value or one which is not supported.

Reserved values shall not be transmitted by an SC conforming to this version of the specification.

1) "Unknown" is used when the user or network has no a priori information about the numbering plan. In this case, the Address-Value field is organized according to the network dialling plan, e.g. prefix or escape digits might be present.

2) The international format shall be accepted also when the message is destined to a recipient in the same country as the MSC or as the SGSN.

3) Prefix or escape digits shall not be included.

4) "Network specific number" is used to indicate administration/service number specific to the serving network, e.g. used to access an operator.

Figure 2 continued

5) "Subscriber number" is used when a specific short number representation is stored in one or more SCs as part of a higher layer application. (Note that "Subscriber number" shall only be used in connection with the proper PID referring to this application).

Numbering-plan-identification

Bits 3 2 1 0

| Bits | Plan |
|---|---|
| 0 0 0 0 | Unknown |
| 0 0 0 1 | ISDN/telephone numbering plan (E.164 [17]/E.163[18]) |
| 0 0 1 1 | Data numbering plan (X.121) |
| 0 1 0 0 | Telex numbering plan |
| 0 1 0 1 | Service Centre Specific plan [1] |
| 0 1 1 0 | Service Centre Specific plan [1] |
| 1 0 0 0 | National numbering plan |
| 1 0 0 1 | Private numbering plan |
| 1 0 1 0 | ERMES numbering plan (ETSI DE/PS 3 01-3) |
| 1 1 1 1 | Reserved for extension |

All other values are reserved.

1) "Service Centre specific number" is used to indicate a numbering plan specific to External Short Message Entities attached to the SMSC.

For Type-of-number = 101 bits 3,2,1,0 are reserved and shall be transmitted as 0000. Note that for addressing any of the entities SC, MSC, SGSN or MS, Numbering-plan-identification = 0001 shall always be used. However, for addressing the SME, any specified Numbering-plan-identification value may be used.

The MS shall interpret reserved values as "Unknown" but shall store them exactly as received.

The SC may reject messages with a type of number containing a reserved value or one which is not supported.

Reserved values shall not be transmitted by an SC conforming to this version of the specification.

Within the Address-Value field, either a semi-octet or an alphanumeric[1] representation applies.

The maximum length of the full address field (Address-Length, Type-of-Address and Address-Value) is 12 octets.

1) Applies only to addressing at the SM-TL.

Figure 2 continued

Example #6

9.1.2.5 Address fields

Address fields used by SM-RL are specified in 3GPP TS 24.011 [13] and 3GPP TS 29.002 [15].

Each address field of the SM-TL consists of the following sub-fields: An Address-Length field of one octet, a Type-of-Address field of one octet, and one Address-Value field of variable length; as shown below:

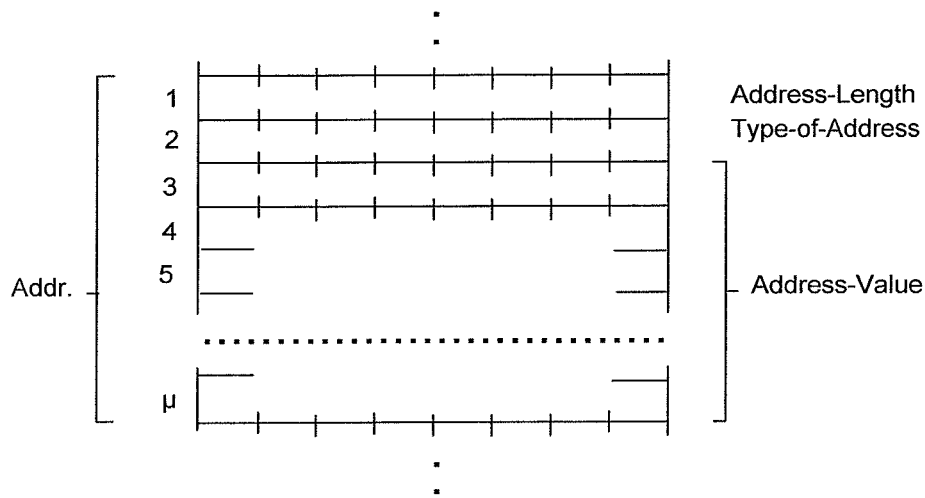

The Address-Length field is an integer representation of the number of useful semi-octets within the Address-Value field, i.e. excludes any semi octet containing only fill bits.

The Type-of-Address field format is as follows <u>for ToN values 000-110</u>:

The Type-of-Address field format is as follows <u>for ToN value 111</u>:

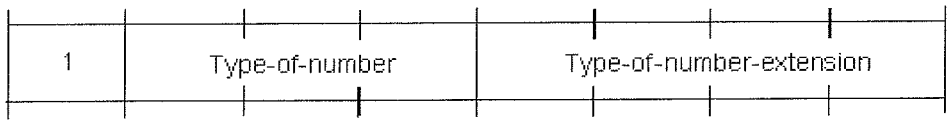

Figure 3

Type-of-number:

Bits  6 5 4

0 0 0        Unknown [1]

0 0 1        International number [2]

0 1 0        National number [3]

0 1 1        Network specific number [4]

1 0 0        Subscriber number [5]

1 0 1        Alphanumeric, (coded according to 3GPP TS 23.038 [9] GSM 7-bit default alphabet)

1 1 0        Abbreviated number 1 1 1        ~~Reserved for extension~~ <u>Extended value used (refer to the Type-of-Number-Extension Table)</u>

<u>Type-of-number-Extension:</u>

<u>Bits   3 2 1 0</u>

<u>0 0 0 0     URI (coded according to UCS2)</u>
        <u>0 0 0 1     NAI (coded according toUCS2)</u>
        <u>0 0 1 0     IPv4 address  (coded as Octet representation according to section 9.1.2.2)</u>
        <u>0 0 1 1     IPv6 address</u> [6]
        <u>0 1 0 0     FQDN (coded according toUCS2)</u>
        <u>1 1 1 1     Reserved for extension</u>
        <u>All other values are reserved.</u>

The MS shall interpret reserved values as "Unknown" but shall store them exactly as received.

The SC may reject messages with a type of number containing a reserved value or one which is not supported.

Reserved values shall not be transmitted by an SC conforming to this version of the specification.

1) "Unknown" is used when the user or network has no a priori information about the numbering plan. In this case, the Address-Value field is organized according to the network dialing plan, e.g. prefix or escape digits might be present.

2) The international format shall be accepted also when the message is destined to a recipient in the same country as the MSC or as the SGSN.

3) Prefix or escape digits shall not be included.

4) "Network specific number" is used to indicate administration/service number specific to the serving network, e.g. used to access an operator.

Figure 3 continued

5) "Subscriber number" is used when a specific short number representation is stored in one or more SCs as part of a higher layer application. (Note that "Subscriber number" shall only be used in connection with the proper PID referring to this application).

6) "IPv6 address" is coded as Octet representation according to section 9.1.2.2, with the first 64-bits (the prefix) stored in the Address-Value field and optionally the remaining 64-bits (the interface identifier) stored in the "TP-OA IPv6 Interface Identifier" or "TP-DA IPv6 Interface Identifier" TP-UD Header information elements.

Numbering-plan-identification

Bits   3 2 1 0

| Bits | Meaning |
|---|---|
| 0 0 0 0 | Unknown |
| 0 0 0 1 | ISDN/telephone numbering plan (E.164 [17]/E.163[18]) |
| 0 0 1 1 | Data numbering plan (X.121) |
| 0 1 0 0 | Telex numbering plan |
| 0 1 0 1 | Service Centre Specific plan [1) |
| 0 1 1 0 | Service Centre Specific plan [1) |
| 1 0 0 0 | National numbering plan |
| 1 0 0 1 | Private numbering plan |
| 1 0 1 0 | ERMES numbering plan (ETSI DE/PS 3 01-3) |
| 1 1 1 1 | Reserved for extension |

All other values are reserved.

1) "Service Centre specific number" is used to indicate a numbering plan specific to External Short Message Entities attached to the SMSC.

For Type-of-number = 101 bits 3,2,1,0 are reserved and shall be transmitted as 0000. Note that for addressing any of the entities SC, MSC, SGSN or MS, Numbering-plan-identification = 0001 shall always be used. However, for addressing the SME, any specified Numbering-plan-identification value may be used.

The MS shall interpret reserved values as "Unknown" but shall store them exactly as received.

The SC may reject messages with a type of number containing a reserved value or one which is not supported.

Reserved values shall not be transmitted by an SC conforming to this version of the specification.

Within the Address-Value field, either a semi-octet or an alphanumeric[1)] representation applies.

Figure 3 continued

The maximum length of the full address field (Address-Length, Type-of-Address and Address-Value) is 12 octets.

1) Applies only to addressing at the SM-TL.

Figure 3 continued 9.2.3.24    TP-User Data (TP-UD)

The length of the TP-User-Data field is defined in the PDU's of the SM-TL (see clause 9.2.2).

The TP-User-Data field may comprise just the short message itself or a Header in addition to the short message depending upon the setting of TP-UDHI.

Where the TP-UDHI value is set to 0 the TP-User-Data field comprises the short message only, where the user data can be 7 bit (default alphabet) data, 8 bit data, or 16 bit (UCS2 [24]) data.

Where the TP-UDHI value is set to 1 the first octets of the TP-User-Data field contains a Header in the following order starting at the first octet of the TP-User-Data field.

Irrespective of whether any part of the User Data Header is ignored or discarded, the MS shall always store the entire TPDU exactly as received.

| FIELD | LENGTH |
| --- | --- |
| Length of User Data Header | 1 octet |
| Information-Element-Identifier "A" | 1 octet |
| Length of Information-Element "A" | 1 octet |
| Information-Element "A" Data | 0 to "n" octets |
| Information-Element-Identifier "B" | 1 octet |
| Length of Information-Element "B" | 1 octet |
| Information-Element "B" Data | 0 to "n" octets |
| Information-Element-Identifier "X" | 1 octet |
| Length of Information-Element "X" | 1 octet |
| Information-Element "X" Data | 0 to "n" octets |

The diagram below shows the layout of the TP-User-Data-Length and the TP-User-Data for uncompressed GSM 7 bit default alphabet data. The UDHL field is the first octet of the TP-User-Data content of the Short Message.

Figure 3 continued

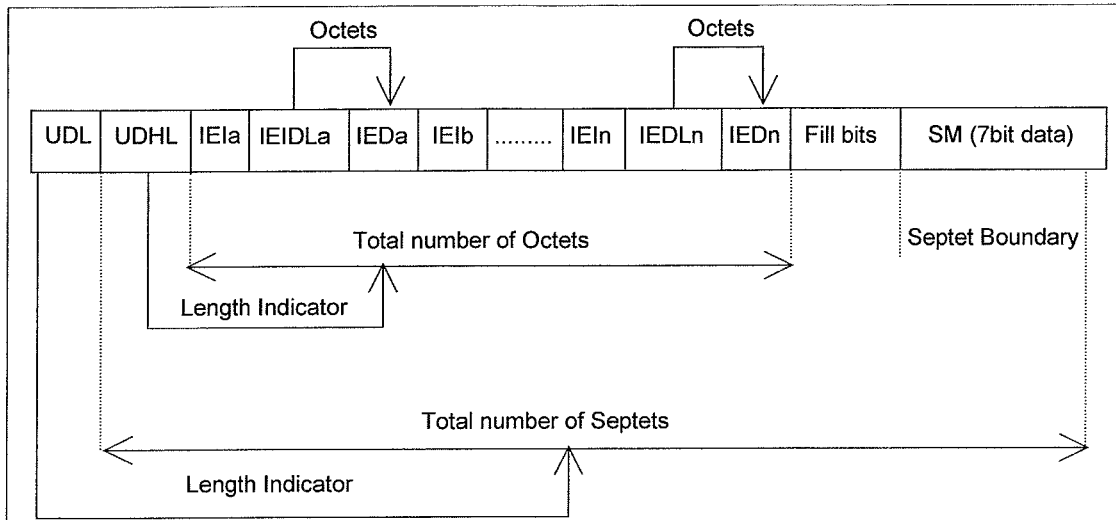
Figure 9.2.3.24 (a)
The diagram below shows the layout of the TP-User-Data-Length and the TP-User-Data for uncompressed 8 bit data or uncompressed UCS2 data. The UDHL field is the first octet of the TP-User-Data content of the Short Message.
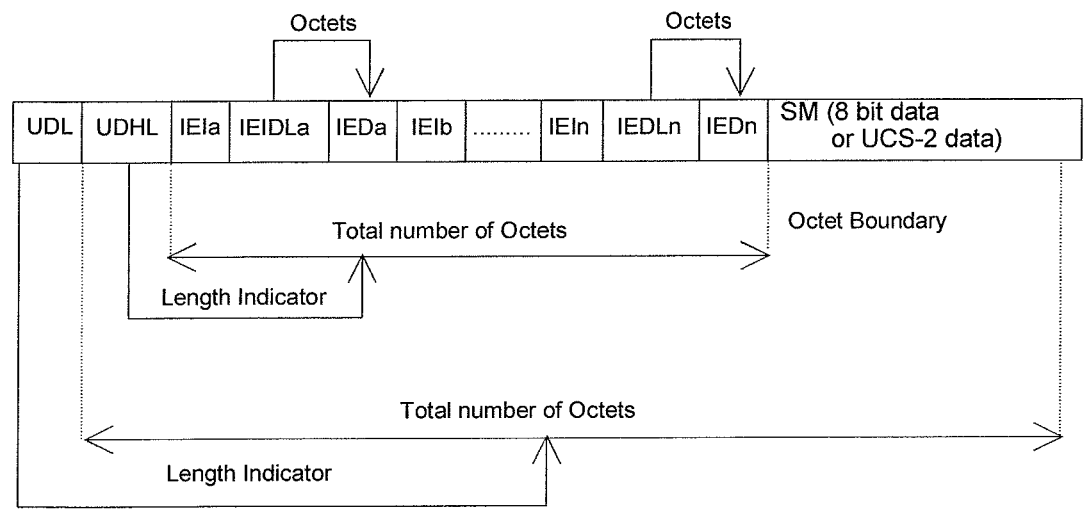
Figure 9.2.3.24 (b)
Figure 3 continued The diagram below shows the layout of the TP-User-Data-Length and the TP-User-Data for compressed GSM 7 bit default alphabet data, compressed 8 bit data or compressed UCS2 data. The UDHL field is the first octet of the TP-User-Data content of the Short Message.

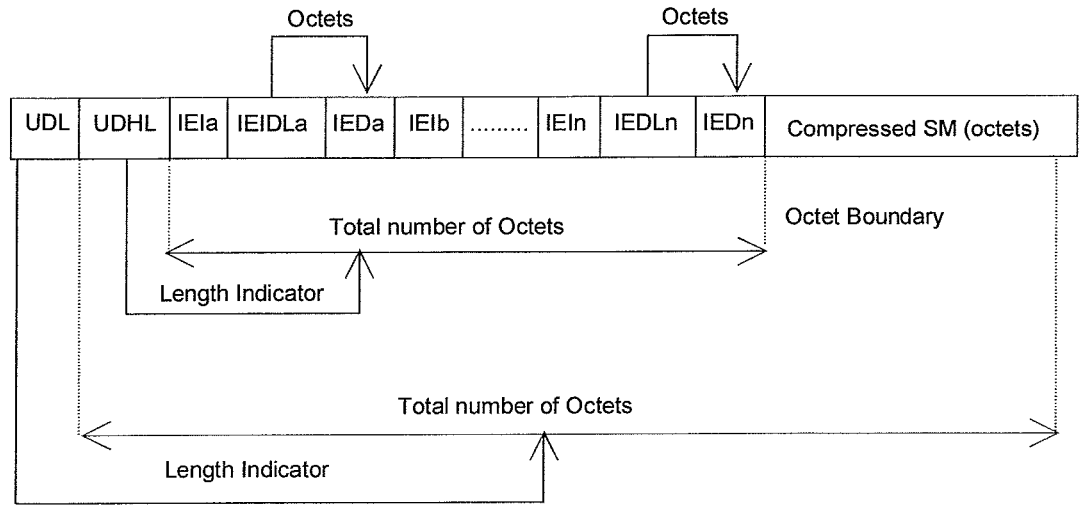

Figure 9.2.3.24 (c)

The definition of the TP-User-Data-Length field which immediately precedes the "Length of User Data Header" is unchanged and shall therefore be the total length of the TP-User-Data field including the Header, if present. (see 9.2.3.16).

The "Length-of-Information-Element" fields shall be the integer representation of the number of octets within its associated "Information-Element-Data" field which follows and shall not include itself in its count value.

The "Length-of-User-Data-Header" field shall be the integer representation of the number of octets within the "User-Data-Header" information fields which follow and shall not include itself in its count or any fill bits which may be present (see text below).

Information Elements may appear in any order and need not follow the order used in the present document. Information Elements are classified into 3 categories as described below.

- SMS Control – identifies those IEIs which have the capability of dictating SMS functionality.
- EMS Control – identifies those IEIs which manage EMS Content IEIs.
- EMS Content – identifies those IEIs containing data of a unique media format.

Figure 3 continued

It is permissible for certain IEs to be repeated within a short message, or within a concatenated message. There is no restriction on the repeatability of IEs in the EMS Content classification. The repeatability of SMS Control and EMS Control IEs is determined on an individual basis. See the IE table below for the repeatability of each IE.

In the event that IEs determined as not repeatable are duplicated, the last occurrence of the IE shall be used. In the event that two or more IEs occur which have mutually exclusive meanings (e.g. an 8bit port address and a 16bit port address), then the last occurring IE shall be used.

If the length of the User Data Header is such that there are too few or too many octets in the final Information Element then the whole User Data Header shall be ignored.

If any reserved values are received within the content of any Information Element then that part of the Information Element shall be ignored.

The support of any Information Element Identifier is optional unless otherwise stated.

The Information Element Identifier octet shall be coded as follows:

Figure 3 continued

| VALUE (hex) | MEANING | Classification | Repeatability |
|---|---|---|---|
| 00 | Concatenated short messages, 8-bit reference number | SMS Control | No |
| 01 | Special SMS Message Indication | SMS Control | Yes |
| 02 | Reserved | N/A | N/A |
| 03 | Value not used to avoid misinterpretation as <LF> character | N/A | N/A |
| 04 | Application port addressing scheme, 8 bit address | SMS Control | No |
| 05 | Application port addressing scheme, 16 bit address | SMS Control | No |
| 06 | SMSC Control Parameters | SMS Control | No |
| 07 | UDH Source Indicator | SMS Control | Yes |
| 08 | Concatenated short message, 16-bit reference number | SMS Control | No |
| 09 | Wireless Control Message Protocol | SMS Control | Note 3 |
| 0A | Text Formatting | EMS Control | Yes |
| 0B | Predefined Sound | EMS Content | Yes |
| 0C | User Defined Sound (iMelody max 128 bytes) | EMS Content | Yes |
| 0D | Predefined Animation | EMS Content | Yes |
| 0E | Large Animation (16*16 times 4 = 32*4 =128 bytes) | EMS Content | Yes |
| 0F | Small Animation (8*8 times 4 = 8*4 =32 bytes) | EMS Content | Yes |
| 10 | Large Picture (32*32 = 128 bytes) | EMS Content | Yes |
| 11 | Small Picture (16*16 = 32 bytes) | EMS Content | Yes |
| 12 | Variable Picture | EMS Content | Yes |
| 13 | User prompt indicator | EMS Control | Yes |
| 14 | Extended Object | EMS Content | Yes |
| 15 | Reused Extended Object | EMS Control | Yes |
| 16 | Compression Control | EMS Control | No |
| 17 | Object Distribution Indicator | EMS Control | Yes |
| 18 | Standard WVG object | EMS Content | Yes |
| 19 | Character Size WVG object | EMS Content | Yes |
| 1A | Extended Object Data Request Command | EMS Control | No |
| 1B-1F | Reserved for future EMS features (see subclause 3.10) | N/A | N/A |
| 20 | RFC 5322 E-Mail Header | SMS Control | No |
| 21 | Hyperlink format element | SMS Control | Yes |
| 22 | Reply Address Element | SMS Control | No |
| 23 | Enhanced Voice Mail Information | SMS Control | No |
| 24 | National Language Single Shift | SMS Control | No |
| 25 | National Language Locking Shift | SMS Control | No |
| 26 | TP-OA IPv6 Interface Identifier | SMS Control | No |
| 27 | TP-DA IPv6 Interface Identifier | SMS Control | No |
| 286 – 6F | Reserved for future use | N/A | N/A |
| 70 – 7F | (U)SIM Toolkit Security Headers | SMS Control | Note 1 |
| 80 – 9F | SME to SME specific use | SMS Control | Note 2 |
| A0 – BF | Reserved for future use | N/A | N/A |
| C0 – DF | SC specific use | SMS Control | Note 2 |
| E0 – FF | Reserved for future use | N/A | N/A |

Note 1: The functionality of these IEIs is defined in 3GPP TSG 31.115 [28], and therefore, the repeatability is not within the scope of this document and will not be determined here.
Note 2: The functionality of these IEIs is used in a proprietary fashion by different SMSC vendors, and therefore, are not within the scope of this technical specification.
Note 3: The functionality of these IEIs is defined by the WAP Forum and therefore the repeatability is not within the scope of this document and will not be determined here.

Figure 3 continued

A receiving entity shall ignore (i.e. skip over and commence processing at the next information element) any information element where the IEI is Reserved or not supported. The receiving entity calculates the start of the next information element by looking at the length of the current information element and skipping that number of octets.

The SM itself may be coded as 7, 8 or 16 bit data.

If 7 bit data is used and the TP-UD-Header does not finish on a septet boundary then fill bits are inserted after the last Information Element Data octet up to the next septet boundary so that there is an integral number of septets for the entire TP-UD header. This is to ensure that the SM itself starts on an septet boundary so that an earlier Phase mobile shall be capable of displaying the SM itself although the TP-UD Header in the TP-UD field may not be understood.

It is optional to make the first character of the SM itself a Carriage Return character encoded according to the default 7 bit alphabet so that earlier Phase mobiles, which do not understand the TP-UD-Header, shall over-write the displayed TP-UD-Header with the SM itself.

If 16 bit (USC2) data is used then padding octets are not necessary. The SM itself shall start on an octet boundary.

If 8 bit data is used then padding is not necessary. An earlier Phase mobile shall be able to display the SM itself although the TP-UD header may not be understood.

It is also possible for mobiles not wishing to support the TP-UD header to check the value of the TP-UDHI bit in the SMS-Deliver PDU and the first octet of the TP-UD field and skip to the start of the SM and ignore the TP-UD header.

*<text removed for brevity>*

9.2.3.24.17    TP-OA IPv6 Interface Identifier

This information element is used to indicate the least significant 64-bits of the IPv6 address whose prefix is stored in the TP-OA field.

This IE is coded as an Octet representation as defined in clause 9.1.2.2.

A receiving entity shall ignore (i.e. skip over and commence processing at the next information element) this information element if the value of the TP-OA field is not an IPv6 address.

If this IE is duplicated within different segments of a concatenated message then a receiving entity shall process the first instance and silently discard all others.

In the event that this IE is duplicated within one segment of a concatenated message or a single message then a receiving entity shall use the last occurrence of the IE.

Figure 3 continued 9.2.3.24.18     TP-DA IPv6 Interface Identifier

This information element is used to indicate the least significant 64-bits of the IPv6 address whose prefix is stored in the TP-DA field.

This IE is coded as an Octet representation as defined in clause 9.1.2.2.

A receiving entity shall ignore (i.e. skip over and commence processing at the next information element) this information element if the value of the TP-DA field is not an IPv6 address.

If this IE is duplicated within different segments of a concatenated message then a receiving entity shall use only the first occurrence of the IE and silently discard all others.

If this IE is duplicated within one segment of a concatenated message or a single message then a receiving entity shall use only the first occurrence of the IE and silently discard all others.

Figure 3 continued

Example #8

9.1.2.6 Enhanced Address fields

Address fields used by SM-RL are specified in 3GPP TS 24.011 [13] and 3GPP TS 29.002 [15].

Each address field of the SM-TL consists of the following sub-fields: An Address-Length field of one octet, a Type-of-Address field of one octet, and one Address-Value field of variable length; as shown below:

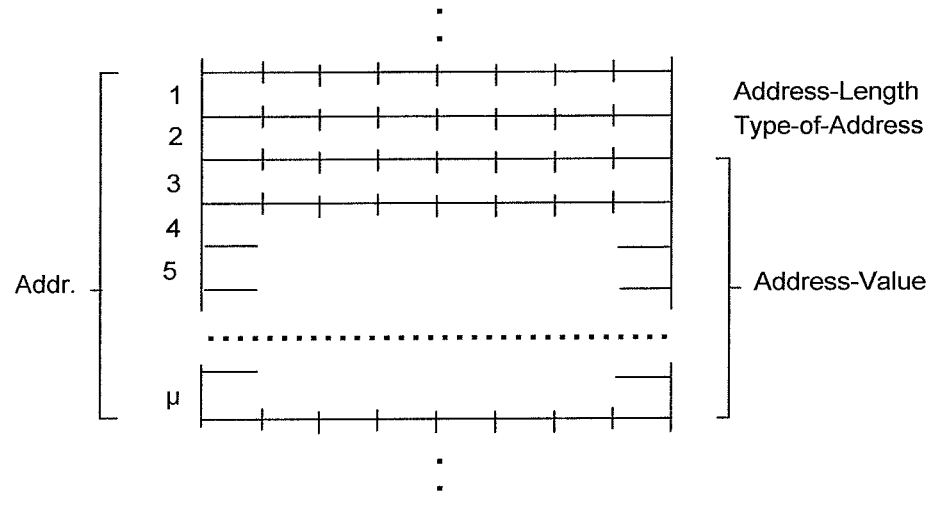

The Address-Length field is an integer representation of the number of useful semi-octets within the Address-Value field, i.e. excludes any semi octet containing only fill bits.

The Type-of-Address field format is as follows:

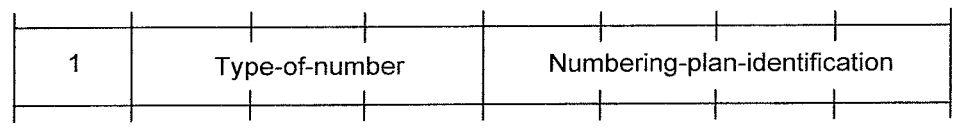

Type-of-number:
   Bits 6 5 4

0 0 0    Unknown [1]

0 0 1    International number [2]

0 1 0    National number [3]

0 1 1    Network specific number [4]

Figure 4

> 1 0 0      Subscriber number [5]
>
> 1 0 1      Alphanumeric (coded according to UCS2)
>
> 1 1 0      Abbreviated number
>
> 1 1 1      Reserved for extension
>
> The MS shall interpret reserved values as "Unknown" but shall store them exactly as received.
>
> The SC may reject messages with a type of number containing a reserved value or one which is not supported.
>
> Reserved values shall not be transmitted by an SC conforming to this version of the specification.
>
> 1) "Unknown" is used when the user or network has no a priori information about the numbering plan. In this case, the Address-Value field is organized according to the network dialling plan, e.g. prefix or escape digits might be present.
>
> 2) The international format shall be accepted also when the message is destined to a recipient in the same country as the MSC or as the SGSN.
>
> 3) Prefix or escape digits shall not be included.
>
> 4) "Network specific number" is used to indicate administration/service number specific to the serving network, e.g. used to access an operator.
>
> 5) "Subscriber number" is used when a specific short number representation is stored in one or more SCs as part of a higher layer application. (Note that "Subscriber number" shall only be used in connection with the proper PID referring to this application).
>
> Numbering-plan-identification
>
>     Bits    3 2 1 0
>
>          0 0 0 0      Unknown
>
>          0 0 0 1      ISDN/telephone numbering plan (E.164 [17]/E.163[18])
>
>          0 0 1 1      Data numbering plan (X.121)
>
>          0 1 0 0      Telex numbering plan
>
>          0 1 0 1      Service Centre Specific plan [1]
>
>          0 1 1 0      Service Centre Specific plan [1]
>
>          1 0 0 0      National numbering plan
>
>          1 0 0 1      Private numbering plan
>
>          1 0 1 0      ERMES numbering plan (ETSI DE/PS 3 01-3)
>
>          1 1 1 1      Reserved for extension
>
>          All other values are reserved.
>
> 1) "Service Centre specific number" is used to indicate a numbering plan specific to External Short Message Entities attached to the SMSC.

Figure 4 continued

For Type-of-number = 101 bits 3,2,1,0 are reserved and shall be transmitted as 0000. Note that for addressing any of the entities SC, MSC, SGSN or MS, Numbering-plan-identification = 0001 shall always be used. However, for addressing the SME, any specified Numbering-plan-identification value may be used.

The MS shall interpret reserved values as "Unknown" but shall store them exactly as received.

The SC may reject messages with a type of number containing a reserved value or one which is not supported.

Reserved values shall not be transmitted by an SC conforming to this version of the specification.

Within the Address-Value field, either a semi-octet or an alphanumeric[1] representation applies.

The maximum length of the full address field (Address-Length, Type-of-Address and Address-Value) is 130 octets.

1)   Applies only to addressing at the SM-TL.

Figure 4 continued

Example #10

9.2.2.1a SMS-DELIVER-EXTENDED type

Basic elements of the SMS-DELIVER type:

| Abbr. | Reference | P[1] | R[2] | Description |
|---|---|---|---|---|
| TP-MTI | TP-Message-Type-Indicator | M | 2b | Parameter describing the message type. |
| TP-MMS | TP-More-Messages-to-Send | M | b | Parameter indicating whether or not there are more messages to send |
| TP-LP | TP-Loop-Prevention | O | b | Parameter indicating that SMS applications should inhibit forwarding or automatic message generation that could cause infinite looping. |
| TP-RP | TP-Reply-Path | M | b | Parameter indicating that Reply Path exists. |
| TP-UDHI | TP-User-Data-Header-Indicator | O | b | Parameter indicating that the TP-UD field contains a Header |
| TP-SRI | TP-Status-Report-Indication | O | b | Parameter indicating if the SME has requested a status report. |
| TP-OA2 | TP-Originating-Address2 | M | 2-12o | Address of the originating SME. |
| TP-DA2 | TP-Destination-Address2 | M | 2-12o | Address of the destination SME. |
| TP-PID | TP-Protocol-Identifier | M | o | Parameter identifying the above layer protocol, if any. |
| TP-DCS | TP-Data-Coding-Scheme | M | o | Parameter identifying the coding scheme within the TP-User-Data. |
| TP-SCTS | TP-Service-Centre-Time-Stamp | M | 7o | Parameter identifying time when the SC received the message. |
| TP-UDL | TP-User-Data-Length | M | I | Parameter indicating the length of the TP-User-Data field to follow. |
| TP-UD | TP-User-Data | O | 3) | |

1) Provision; Mandatory (M) or Optional (O).

2) Representation; Integer (I), bit (b), 2 bits (2b), Octet (o), 7 octets (7o), 2-12 octets (2-12o).

3) Dependent on the TP-DCS.

Layout of SMS-DELIVER:

ENHANCING SHORT MESSAGE SERVICE ADDRESSING AND ROUTING

BACKGROUND

The Short Message Service (SMS) is a messaging mechanism that can deliver messages of 140 octets between subscribers or to/from an application, service, or other component in a network from/to a subscriber. SMS exists currently in GSM (Global System for Mobile communications) and UMTS (Universal Mobile Telephony System) and will likely be part of deployments in Third Generation Partnership Project (3GPP) LTE (Long Term Evolution) systems. The message payload commonly contains plain text, but there are provisions for other types of data, such as pictures, graphics, and ring tones. An SMS message may be, for example, a text message, machine-to-machine type message, binary encoded message, multimedia messaging service (MMS) indication message, or picture message. Any such message will be referred to herein as an SMS message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates example coding of possible enhancements to the SMS protocol defined in 3GPP TS 23.040, according to one embodiment.

FIG. 3 illustrates example coding of possible enhancements to 3GPP TS 23.040, according to another embodiment.

FIG. 4 illustrates an example of possible enhancements to 3GPP TS 23.040 to define a new format for address fields in enhanced SMS messages, according to one embodiment.

DETAILED DESCRIPTION

Figure 1:
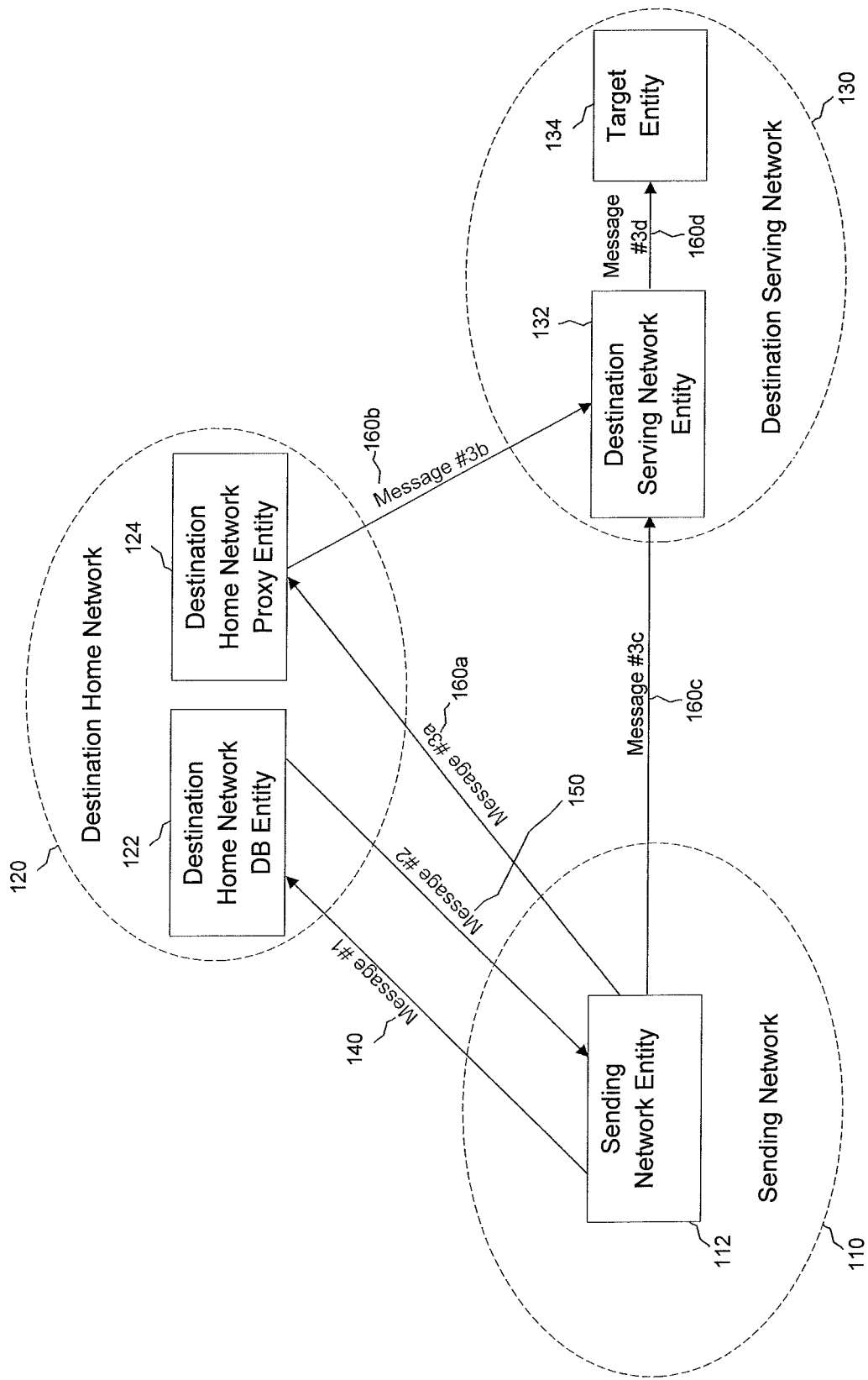
FIG. 1 is a reference architecture for device-terminated SMS messaging.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Various types of messages can be sent to or from a network end point (e.g., a wireless device or fixed-line device). For the sake of simplicity and brevity, the present disclosure will be directed to Short Message Service (SMS) messages, although various other types of messages originating from or being sent to a mobile device are contemplated by the present disclosure.

As used herein, terms such as "mobile device", "mobile station", "MS", "user equipment", "UE", "target entity", wireless device, or network endpoint may be used interchangeably and may refer to transportable devices such as mobile telephones, smartphones, personal digital assistants, handheld, tablet, nettop, or laptop computers, and similar devices that have telecommunications capabilities. In other cases, such terms might refer to devices that have similar capabilities but that are not transportable, such as desktop computers, set-top boxes, or network appliances. Such terms can also refer to any hardware or software component that can terminate a communication session for a user.

SMS messages sent from a mobile device are known as Mobile Originated (MO), and SMS messages sent to a mobile device are known as Mobile Terminated (MT).

Based on conventional practice, SMS is defined for use only with destination addresses that have the form of numbers or a string of digits ("digit strings") such as "15555555555" or "07700900123". Each digit string may be classified as a "type of number" and can be one of the following types: an international number, a national number, a network specific number, a subscriber number, an abbreviated number, or an unknown type of number. An international number, a national number, a network specific number, a subscriber number, or an abbreviated number may use one or more of the following standardized numbered addressing plans: an integrated services digital network (ISDN)/telephone numbering plan, a data numbering plan, a telex numbering plan, a service center specific plan (that is, a numbering plan specific to external short message entities attached to a short message service center (SMSC)), a national numbering plan, a private numbering plan, the ERMES (European Radio Messaging System) numbering plan, or an unknown numbering plan.

Another, non-numeric "type of number", called "alphanumeric", provides a non-routable source identity and may be used for automatically generated, application originated MT SMS messages from a subscribed service. These automatically generated, application originated MT SMS messages may include content such as the latest sports results, or may be messages from a non-subscribed service, such as an advertisement message or a confirmation of an input provided via SMS message (e.g., a "text vote").

SMS uses the ISDN telephone numbering plan (e.g., as defined in ITU-T E.164) for inter-operator routing of SMS messages to a mobile device. A device identifier used to identify a device that follows this numbering plan is known as a Mobile Station ISDN Number (MSISDN). The MSISDN is a type of Public address, which is may be referred to as a Public User Identity. The MSISDN is the key (i.e., input) to a look-up operation that returns information used for routing of SMS messages to the mobile device. The look-up operation may request the routing information from a database (e.g., a Home Location Register (HLR) or a Home Subscriber Server (HSS)) of the mobile device's home operator associated with a given MSISDN. The terms HLR and HSS may be used interchangeably herein. However, one skilled in the art will appreciate that these are network nodes that contain information associated with the device identifier. For the purpose of the description, the HLR/HSS may be assumed to be a standalone entity; however the information could alternatively be stored in another entity in the network such as, but not limited to, a SIP Proxy/Server (e.g., an I-CSCF or an S-CSCF), a Diameter Node (e.g., a Diameter Server, a Diameter Client, or a Diameter Agent (e.g., a Diameter Relay, a Diameter Proxy, or a Diameter Redirect)), an SMPP Server, an MME, an SGSN, an MSC, an IW-MSC, a G-MSC, an SMS-SC or an SMSC, an IP-SM-GW, an MTC-AA, or an MTC-IWF, etc. Among the information returned from the look-up operation are the location of the mobile device and a private address. In other words, the location of the mobile device and the private address determined from the look-up table are associated with a specific MSISDN (i.e., a device identifier of the mobile device). The device location may be given by one or a plurality of serving node addresses, such as, but not limited to, a mobile services switching center (MSC) address, a Mobility Management Entity (MME), or a serving GPRS support node (SGSN) address. The private address is known as the International Mobile Station Identity (IMSI) (also known as an E.212 number), and may be used to uniquely identify a subscriber on the current serving node, such as an MSC, an MME, and/or an SGSN. In other words, the IMSI may further be used to uniquely identify a mobile device associated with the subscriber. Another form of private address could be a Mobile Identification Number (MIN) as used in CDMA2000 and TDMA systems. Under existing procedures, without an MSISDN, a mobile device cannot be looked up in an HLR to determine the mobile device's location (e.g., serving node address) and its private address (e.g., IMSI), and therefore, currently, SMS messages cannot be routed to the mobile device without an MSISDN.

Embodiments of the present disclosure provide an SMS messaging system that does not require MSISDNs. To aid in the following discussion of the embodiments, FIG. 1 is provided to show the messaging flow for delivery of an MT SMS message. Unless otherwise stated, FIG. 1 may be referenced for the message flow-related terminology used hereinafter.

In FIG. 1, a sending network 110 includes a sending network entity 112. A destination home network 120 includes a destination home network database (DB) entity 122 and a destination home network proxy entity 124. A destination serving network 130 includes a destination serving network entity 132 and a target entity 134. Those skilled in the art will appreciate that the sending network 110, the destination home network 120, and the destination serving network 130 may each be, but are not limited to, a mobile network, a cellular operator network, a fixed-line network, a cable network, or a carrier network. Those skilled in the art will also appreciate that these networks could be combined in various ways. For example, the sending network 110 and the destination home network 120 may be combined, the destination home network 120 and the destination serving network 130 may be combined, and so on.

The sending network entity 112 may be one or a combination of, for example, an SMSC/SMS-SC, an SMS Router, an MO-SMS Router, an SMS-GMSC, an SMS-IWMSC, a SIP Proxy/Server (e.g., an Application Server, an I-CSCF, or an S-CSCF), a Diameter Node (e.g., a Diameter Server, a Diameter Client, or a Diameter Agent (e.g., a Diameter Relay, a Diameter Proxy, or a Diameter Redirect)), an IP-SM-GW, a Services Capability Server, an MTC-IWF, or an SMPP Server.

The destination home network DB entity 122 may be, but is not limited to, an HLR or an HSS, a SIP Proxy/Server (e.g., an Application Server, an I-CSCF or an S-CSCF), a Diameter Node (e.g., a Diameter Server, a Diameter Client, or a Diameter Agent (e.g., a Diameter Relay, a Diameter Proxy, or a Diameter Redirect)), an SMPP Server, an MME, an SGSN, an MSC, an IW-MSC, a G-MSC, an SMS-SC or an SMSC, an IP-SM-GW, an MTC-AA, or an MTC-IWF.

The destination home network proxy entity 124 may be, but is not limited to, an SMS Router, an MT-SMS Router, an IP-SM-GW, an MTC-AA, an MTC-IWF, a SIP Proxy/Server (e.g., an Application Server, an I-CSCF, or an S-CSCF), a Diameter Node (e.g., a Diameter Server, a Diameter Client, or a Diameter Agent (e.g., a Diameter Relay, a Diameter Proxy, or a Diameter Redirect)), or an SMPP Server, etc.

The destination serving network entity 132 may be, but is not limited to, one or a combination of, for example, an MSC, a VLR, an MSC/VLR, an MSC-Server, an SGSN, an MME, an IP-SM-GW, a SIP Proxy/Server (e.g., an Application Server, an I-CSCF, or an S-CSCF), Diameter Node (e.g., a Diameter Server, a Diameter Client, or a Diameter Agent (e.g., a Diameter Relay, a Diameter Proxy, or a Diameter Redirect)), or an SMPP Server.

The target entity 134 may be, but is not limited to, a mobile device as described above. Those skilled in the art will appreciate that the target entity 134 may not be located in a network belonging to the destination serving network 130. For example, the target entity 134 may be located in a coverage area of a third party local area network (LAN) or a third party wireless network (e.g., a wireless LAN (WLAN), or a cellular network, also often referred to as a mobile network). However, the target entity 134 may be assumed to be reachable by (i.e., in communication with) the destination serving network entity 132 in order for SMS messages to be delivered.

The sending network entity 112 may receive an SMS message from a component such as a mobile device or a network node. An SMS message received by the sending network entity 112 may be transmitted to the target entity 134 by one of two different routes. In a first route, the sending network entity 112 sends the SMS message in message 3a 160a to the destination home network proxy entity 124; the destination home network proxy entity 124 then sends the SMS message in message 3b 160b to the destination serving network entity 132; the destination serving network entity 132 then sends the SMS message in message 3d 160d to the target entity 134. In a second route, the sending network entity 112 sends the SMS message in message 3c 160c to the destination serving network entity 132; the destination serving network entity 132 then sends the SMS message in message 3d 160d to the target entity 134. Responses to messages 3a, 3b and 3d or messages 3c and 3d may follow the respective return paths. References made herein to message #3 160 of FIG. 1 may refer to either of these routing options. The embodiments disclosed herein achieve such messaging when there is no destination MSISDN available. In these embodiments, it will be assumed that an SMS message has been received at the sending network entity 112. The message may have been received via messaging similar to that depicted in FIG. 1.

The messages shown in FIG. 1 may use any one of a number of protocols. The mapping tables in Tables 1a through 1e are provided as examples of the actual messages that may be used for the generic messages shown in FIG. 1 under the Mobile Application Part (MAP) protocol, the Short Message Point-to-point Protocol (SMPP) protocol, the Remote Authentication Dial-In User Service (RADIUS) protocol, the Diameter protocol, and the Session Initiation Protocol (SIP) protocol, respectively.

TABLE 1a

| | MAP Protocol |
|---|---|
| Message #1 | MAP-SEND-ROUTING-INFO-FOR-SM request/indication<br>MAP-SEND-ROUTING-INFO request/response<br>MAP_SEND_ROUTING_INFO_FOR_GPRS request/response<br>MAP-SEND-ROUTING-INFO-FOR-LCS request/indication<br>MAP-ANY-TIME-INTERROGATION request/indication<br>MAP-ANY-TIME-SUBSCRIPTION-INTERROGATION request/indication |
| Message #2 | MAP-SEND-ROUTING-INFO-FOR-SM response/confirm<br>MAP-SEND-ROUTING-INFO response/confirm<br>MAP_SEND_ROUTING_INFO_FOR_GPRS request/response<br>MAP-SEND-ROUTING-INFO-FOR-LCS response/confirm<br>MAP-ANY-TIME-INTERROGATION response/confirm<br>MAP-ANY-TIME-SUBSCRIPTION-INTERROGATION response/confirm |
| Messages #3a, #3b, #3c | MAP-MT-FORWARD-SM request/indication |
| Message #3d | N/A |

TABLE 1b

| | SMPP Protocol |
|---|---|
| Message #1 | N/A |
| Message #2 | N/A |
| Messages #3a, #3b, #3c | submit_sm/"SUBMIT_SM"<br>submit_sm_multi/"SUBMIT_MULTI"<br>deliver_sm/"DELIVER_SM"<br>data_sm/"DATA_SM"<br>replace_sm/"REPLACE_SM" |
| Message #3d | N/A |

TABLE 1c

| | RADIUS Protocol |
|---|---|
| Message #1 | Access-Request<br>Accounting-Request |
| Message #2 | Access-Accept<br>Access-Reject<br>Access-Challenge<br>Accounting-Response |
| Messages #3a, #3b, #3c | Access-Request<br>Accounting-Request |
| Message #3d | N/A |

TABLE 1d

| | Diameter Protocol |
|---|---|
| Message #1 | Update-Location-Request/ULR<br>Any of the above RADIUS messages<br>AA-Request/AAR<br>Accounting-Request/ACR<br>User-Authorization-Request/UAR<br>Server-Assignment-Request/SAR<br>Location-Info-Request/LIR<br>Multimedia-Auth-Request/MAR<br>Push-Profile-Request/PPR<br>User-Data-Request/UDR<br>Profile-Update-Request/PUR<br>Subscribe-Notifications-Request/SNR<br>Push-Notification-Request/PNR<br>Message-Process-Request/MPR<br>Provide-Location-Request/PLR<br>Subscriber-Information-Request/SIR<br>Send-Routing-Info-for-SM-Request/SRR |
| Message #2 | Update-Location-Answer/ULA<br>Any of the above RADIUS messages<br>AA-Answer/AAA<br>Accounting-Answer/ACA<br>User-Authorization-Answer/UAA<br>Server-Assignment-Answer/SAA<br>Location-Info-Answer/LIA<br>Multimedia-Auth-Answer/MAA<br>Push-Profile-Answer/PPA<br>User-Data-Answer/UDA<br>Profile-Update-Answer/PUA<br>Subscriber-Notifications-Answer/SNA<br>Push-Notification-Answer/PNA<br>Message-Process-Answer/MPA<br>Provide-Location-Answer/PLA<br>Subscriber-Information-Answer/SIA<br>Send-Routing-Info-for-SM-Answer/SRA |
| Messages #3a, #3b, #3c | Update-Location-Request/ULR<br>Any of the above RADIUS messages<br>AA-Request/AAR<br>Accounting-Request/ACR<br>User-Authorization-Request/UAR<br>Server-Assignment-Request/SAR<br>Location-Info-Request/LIR<br>Multimedia-Auth-Request/MAR<br>Push-Profile-Request/PPR<br>User-Data-Request/UDR<br>Profile-Update-Request/PUR<br>Subscribe-Notifications-Request/SNR<br>Push-Notification-Request/PNR<br>Message-Process-Request/MPR<br>Provide-Location-Request/PLR<br>MT-Forward-Short-Message-Request/TFR |
| Message #3d | N/A |

TABLE 1e

| | SIP Protocol |
|---|---|
| Message #1 | SIP MESSAGE method<br>SIP INVITE method |
| Message #2 | SIP MESSAGE method<br>SIP INVITE method |
| Messages #3a, #3b, #3c | SIP MESSAGE method<br>SIP INVITE method |
| Message #3d | SIP MESSAGE method<br>SIP INVITE method |

MAP protocol messaging is defined in 3GPP TS 29.002. SMPP protocol messaging is defined in the Short Message Peer to Peer protocol, as published by the SMPP Developer's Forum/SMS Forum. RADIUS messaging is defined in Internet Engineering Task Force (IETF) Request for Comments (RFC) 2865 and IETF RFC 2866. Diameter messaging (also known as Diameter Commands) is defined in IETF RFC 3588, IETF RFC 3589, IETF RFC 4005, IETF 4740, 3GPP TS 29.229, 3GPP TS 29.329, 3GPP TS 29.272, 3GPP TS 29.172, 3GPP TS 29.336, and 3GPP TS 29.338. The SIP INVITE method is defined in IETF RFC 3261, and the SIP MESSAGE method is defined in IETF RFC 3428.

As mentioned above, a mobile device typically must be allocated a Public Address (e.g., an MSISDN) if the mobile device is to be able to receive SMS messages. With the proliferation of mobile devices caused by machine-to-machine (M2M) communication, the numbering scheme used for MSISDNs may near exhaustion. For this and other reasons, it may be desirable to be able to send SMS messages without using an MSISDN as the identifier of the destination device. However, issues may arise if another form of public address or an identifier other than an MSISDN is used for an SMS message.

A first issue is that without an MSISDN as the destination address in the short message, the sending network entity 112 cannot determine the destination home network 120 and the destination home network DB entity 122 within the destination home network 120, since the existing mechanism in SMS for determining the destination home network 120 and the destination home network DB entity 122 relies on MSISDN analysis. This is because the MSISDN is structured in such a way as to globally and uniquely identify a subscriber or other end point within a particular network within a particular country.

A second issue is that even after the sending network entity 112 has determined the destination home network 120 and the destination home network DB entity 122, the sending network entity 112 cannot obtain routing information from the destination home network DB entity 122 (e.g., message #1 140 cannot be sent to the destination home network DB entity 122 by the sending network entity 112) without a destination MSISDN since the current messaging allows only for a destination MSISDN to be used as the "look-up" key in the destination home network DB entity's 122 records for the subscriber's information, such as the IMSI and location details. That is, even if a device's destination home network 120 and destination home network DB entity 122 could be determined without an MSISDN associated with the device, routing information for the device still cannot be determined without the MSISDN.

A third issue is that, in many instances, operators or carriers may use different protocols to deliver SMS messages between their respective networks or sometimes even within their own networks. For example, as shown in Tables 1a through 1e, the operators or carriers may use the MAP protocol, the SMPP protocol, the RADIUS protocol, the Diameter protocol, the SIP protocol, or some other protocol to deliver SMS messages. Based on an analysis of the destination MSISDN, one such protocol may be taken as the default. However, if there is no destination MSISDN, such an analysis cannot be made. That is, discovering a preferred or mandatory protocol to use in reaching a destination, either within a network or between networks, may not be possible without an MSISDN.

A fourth issue is that a routable, alphanumeric destination address cannot be presented in an SMS message, since the destination address in an SMS message currently must be a string of digits. A non-routable alphanumeric identity can currently be used, but only in the originating address field. In addition, the current maximum length of any source identity is 10 octets, which allows for a maximum of only 10 characters or 20 digits.

Issues such as these could be addressed by using IP Multimedia Subsystem (IMS) for the delivery of SMS messages. However, delivering SMS messages via IMS is inefficient due to the overhead of the SIP header fields as well as the required processes, logic, and procedures. Embodiments of the present disclosure provide an SMS messaging system that does not require the use of MSISDNs and does not require the use of IMS.

Embodiments in accordance with the present disclosure will now be described, each addressing at least one of the issues mentioned above. The embodiments may be implemented independently of one another or in various combinations with one another.

A first set of embodiments describes a method that enables the sending network entity 112 to determine if the destination home network 120 of the target entity 134 is enhanced to accommodate addresses other than MSISDNs. In particular, one or more of a uniform resource identifier (URI), a uniform resource locator (URL), a Network Access Identifier (NAI), an IPv4 address, or an IPv6 address may be used as the destination address (also referred to herein as a target entity address or an address of a target entity) of the target entity 134. Hereinafter, unless otherwise indicated, the term "URI" may refer to either a URI or a URL, and the term "IP address" may refer to either an IPv4 address or an IPv6 address. A URI may be, but is not limited to, a SIP or SIPS URI.

In an embodiment, when the sending network entity 112 receives an SMS message for delivery to the target entity 134, the sending network entity 112 determines the destination home network 120 associated with the target entity 134 by obtaining or identifying a domain name that is associated with the destination home network 120. In various embodiments, the sending network entity 112 may obtain or deduce the domain name using one or more of the following methods, depending on the format of the destination address.

If the destination address is a URI, the sending network entity 112 extracts the domain name from the address, where the domain name is the string of characters beginning from the first character after the "@" sign and continuing to the end of the string or until a special character is reached that indicates the end of the domain name, such as the "?" symbol. If no "@" sign is present in the URI or if the URI contains an IP address, then the sending network entity 112 may assume a default domain name. The assumption may be based on all or part of the originating address of the message or on a local configuration. Another form of URI is a Tel URI or Tel URL, which is a URI or URL that may include a "phone-context=domain name;" parameter. For such a URI or URL, the sending network entity 112 may determine the domain name by analyzing the "phone-context" parameter and extracting the string after the "=" sign until the end of the address, which in this example is identified by a semicolon. However, other string-end or terminating characters may signify the end of the domain name, such as a null terminator character, a carriage return character, a line feed character, or a carriage return character followed by a line feed character.

If the destination address is an NAI, the sending network entity 112 may perform the same procedures as described above for a URI.

If the destination address is an IP address or a URI that contains an IP address instead of a domain name, the sending network entity 112 may perform a reverse DNS (domain name system) look-up as per IETF RFC 2317 for IPv4 or IETF RFC 3596 for IPv6 in order to retrieve a domain name that is associated with that IP address.

If the destination address is an arbitrary digit string or character string that is not an ISDN/telephone number (e.g., E.164 number), IMSI (e.g., E.212 number), or any other identity such as a Data numbering plan (e.g., X.121), a Telex numbering plan, a Service Center Specific plan, a National numbering plan, a Private numbering plan, or an ERMES numbering plan, the sending network entity 112 may perform a look-up, for example upon a database, on all or part of the string to determine the destination subscriber's home network 120. The look-up operation performed on, for example, the database may return a destination address in the format of a URI, an NAI, or an IP address, and the respective procedures described above for those types of addresses may apply. In an embodiment, the arbitrary digit string or character string may contain a subset of digits and/or characters that identify the destination home network 120. In one example, the string may be an E.212 mobile country code (MCC) and mobile network code (MNC) that are encoded in decimal/base-10 or hex/base-16, such as 23415 or EAOF. In another example, the string may be a domain name, such as operatorX.co.uk, operatorY.com, mnc015.mcc234.3gppnetwork.org, or mnc0F.mccEA.3gppnetwork.org. In another example, the string may be an E.164 country code (CC) and network destination code (NDC) that are encoded in decimal/base-10 or hex/base-16, such as 441234 or 6BB92. In other cases, the string may be some other suitable identifier that uniquely identifies the destination subscriber's home network 120 either regionally, nationally, or globally. Such schemes may also contain an indicator of the scheme, such as a string of delimited text (e.g., "E212:"), a string of non-delimited text (e.g., "E212"), or a simple numeric, alphanumeric, or alphabetic identifier (e.g., "01", "A1", or "AA").

Once the sending network entity 112 obtains the domain name associated with the destination home network 120, e.g., by any of the methods described above, the sending network entity 112 may obtain a routable address of the destination home network DB entity 122, such as an HLR or HSS. The routable address may be an E.164 address (also known as a global title), an IP address, a SIP URI, a Tel URI or some other type of address. The sending network entity 112 may obtain the routable address by either or both of two methods.

In the first method for obtaining a routable address, the sending network entity 112 may apply a well-known prefix to the domain name, where the prefix may be a string of characters that form a hostname or a hostname with a sub-domain. The prefix and the domain name may together form a fully qualified domain name (FQDN). After the FQDN has been formed, the sending network entity 112 may perform a look-up on the FQDN, for example by using DNS, to resolve the FQDN to a routable address, e.g., an IP address. The sending network entity 112 may then route IP datagrams or signaling to the IP address. For example, MAP messaging may be routed over SIGTRAN over IP, SIP messaging over IP, or SMPP over IP; and Diameter messaging may be routed over TCP over IP or SCTP over IP.

As an example, if the domain name that is obtained is "operator.com" and the hostname that is applied is "hlr", the FQDN for the HLR is "hlr.operator.com". As another example, if the domain name that is obtained is "mnc015.mcc234.3gppnetwork.org" and the hostname with sub-domain that is applied is "hlr.node", the FQDN for the HLR is "hlr.node.mnc015.mcc234.3gppnetwork.org".

In the second method for obtaining a routable address, the sending network entity 112 may perform a look-up operation on the domain name, by using DNS for example, to obtain a list of one or more FQDNs or IP addresses that are associated with a destination home network DB entity.

In either of the above methods, the look-up operation may result in the sending network entity 112 obtaining another domain name or another FQDN that in turn requires a further look-up operation. Also, in either of the above methods, alternatively or in addition to returning an IP address, the look-up operation may return an SS7/C7 signaling address, such as an E.164 address, a global title, a signaling point code, an E.214 address, or a similar address. SS7/C7 signaling may then be routed to the returned address. For example, MAP messaging may be signaled over SS7.

In a second set of embodiments, the methods and messages related to obtaining SMS routing information from the destination home network 120 are enhanced to accommodate addresses other than MSISDNs. In particular, the destination home network DB entity 122 may use an address other than an MSISDN in performing a look-up operation for MT SMS routing information. The destination address may be one or more of a URI, an NAI, or an IP address.

In order to deliver an SMS message to the target entity 134, the sending network entity 112 may first need to obtain routing information for the target entity 134. The routing information may be, for example, a Private address (e.g., the IMSI of the target entity 134), an identity of the destination serving network entity 132 that the target entity 134 is residing on in the destination serving network 130, or an identity of the destination home network proxy entity 124 that is being used. The sending network entity 112 may retrieve such information by querying a database function residing in the destination home network DB entity 122 in the destination home network 120 or by sending a message to the destination home network DB entity 122 (e.g., Message #1 140) and receiving a message back from the destination home network DB entity 122 (e.g., Message #2 150). The addressing or routing of the destination home network 120 may be obtained by using the procedures described above with regard to the first set of embodiments or may be obtained in some other manner.

As depicted in FIG. 1, the sending network entity 112 sends message #1 140 to the destination home network DB entity 122 in order to retrieve information for routing an SMS message. Message #1 140 may be, but is not limited to, a MAP-SEND-ROUTING-INFO-FOR-SM request/indication as shown in Table 1a or a Diameter Send-Routing-Info-for-SM-Request (SRR) command as shown in Table 1d. Those skilled in the art will appreciate that any of the messages shown in Tables 1a through 1e as message #1 may be used as message #1 140. Alternatively, message #1 140 may be any other message that allows one network node to query another node, where the query message contains a destination address that contains a Nature of Address Indicator field and a Type of Number field. In the example of the MAP-SEND-ROUTING-INFO-FOR-SM message, the existing "MSISDN" field may be modified to contain a URI, an NAI, or an IP address. In an embodiment, the query message #1 140 that the sending network entity 112 sends to the destination home network DB entity 122 for the URI of "username@domain.com" may include the user name part only (i.e., "username"), the full address (i.e., username@domain.com), or the user name followed by an indication of the domain name. For example, an octet where each value represents a domain name may be indicated. A possible embodiment is shown below, where three domains have been identified and a code point or value has also been provided that identifies to the destination home network DB entity 122 that the full form of the domain name has been included.

| | |
|---|---|
| 00000000 | Domain name included in full form |
| 00000001 | example1.com |
| 00000010 | example2.com |
| 00000011 | example3.com |

In an embodiment, the sending network entity 112 includes a new information element in message #1 140 that contains an identifier other than an MSISDN. In the case of the MAP protocol, the new information element may be included in the MAP-SEND-ROUTING-INFO-FOR-SM message. The new information element may be included in addition to or alternatively to the MSISDN information element and may be included within another information element in message #1 140, such as "privateExtensionList" or "extensionContainer".

If the new information element is included in addition to the MSISDN information element, then the value of the MSISDN information element may be encoded with a flag, a code point, an identifier, or a dummy value that indicates that the MSISDN is to be ignored or discarded and that an alternative destination address is being used. Alternatively or in addition to a particular value in the MSISDN information element, the presence of a particular information element anywhere in the MAP-SEND-ROUTING-INFO-FOR-SM message may be used to indicate that the MSISDN is to be ignored. Alternatively or additionally, such an indication may be provided by the presence or absence of an information element that contains the alternative destination address or by the presence or absence of a dedicated information element, such as a new information element of type "NULL". The alternative destination address may then be conveyed in a new information element.

Example #1 below provides an example of possible enhancements to the MAP protocol in 3GPP TS 29.002 to support a new information element in addition to the MSISDN. The example is an extract of the ASN.1 definition of the MAP-SEND-ROUTING-INFO-FOR-SM message defined in 3GPP TS 29.002. Any spare or reserved code point may be used to indicate to the receiving entity, in this case the HSS/HLR, to look for the presence of the new information element. For example, bits 7, 6, and 5 may be set to values of 1, 0, and 1, respectively, to indicate the presence of the new information element. In this example and in the other examples that will follow, a variable length of parameters could be used (i.e., each parameter may have a variable length associated with the parameter), as could any naming and/or numbering convention of the information elements. In addition, the character encoding used in alphanumeric fields may be, but is not necessarily limited to, UCS2, ASCII, UTF-8, GSM 7-bit Default Alphabet (optionally with the GSM 7-bit Default Alphabet Extension Table), or the GSM 7-bit National Language Single Shift Table (optionally with a GSM 7-bit National Language Locking Shift Table). In this example and in the other examples that will follow, examples of additions or modifications that may be made to implement the embodiments disclosed herein are double underlined. Examples of deletions that may be made to implement the embodiments disclosed herein are shown by text that has been stricken through.

Example #1

```
RoutingInfoForSM-Arg ::= SEQUENCE {
msisdn                          [0] ISDN-AddressString,
sm-RP-PRI                       [1] BOOLEAN,
serviceCentreAddress            [2] AddressString,
extensionContainer              [6] ExtensionContainer           OPTIONAL,
...,
gprsSupportIndicator            [7] NULL                         OPTIONAL,
-- gprsSupportIndicator is set only if the SMS-GMSC supports
-- receiving of two numbers from the HLR
sm-RP-MTI                       [8] SM-RP-MTI                    OPTIONAL,
sm-RP-SMEA                      [9] SM-RP-SMEA                   OPTIONAL,
sm-deliveryNotIntended          [10] SM-DeliveryNotIntended      OPTIONAL,
ip-sm-gwGuidanceIndicator       [11] NULL                        OPTIONAL,
alternativeDestinationAddress   [12] AlternativeDestinationAddress OPTIONAL }
AddressString ::= OCTET STRING (SIZE (1..maxAddressLength))
-- This type is used to represent a number for addressing
-- purposes. It is composed of
--      a)      one octet for nature of address, and numbering plan
--              indicator.
--      b)      digits of an address encoded as TBCD-String.
-- a)          The first octet includes a one bit extension indicator, a
--             3 bits nature of address indicator and a 4 bits numbering
--             plan indicator, encoded as follows:
-- bit 8: 1 (no extension)
-- bits 765: nature of address indicator
--      000     unknown
--      001     international number
--      010     national significant number
--      011     network specific number
--      100     subscriber number
--      101     reserved
--      110     abbreviated number
--      111     reserved for extension
-- bits 4321: numbering plan indicator
--      0000    unknown
--      0001    ISDN/Telephony Numbering Plan (Rec ITU-T E.164)
--      0010    spare
--      0011    data numbering plan (ITU-T Rec X.121)
--      0100    telex numbering plan (ITU-T Rec F.69)
--      0101    spare
--      0110    land mobile numbering plan (ITU-T Rec E.212)
--      0111    spare
--      1000    national numbering plan
--      1001    private numbering plan
--      1111    reserved for extension
--      all other values are reserved.
-- b)          The following octets representing digits of an address
--             encoded as a TBCD-STRING.
maxAddressLength  INTEGER ::= 20
```

-continued

```
ISDN-AddressString ::=
        AddressString (SIZE (1..maxISDN-AddressLength))
-- This type is used to represent ISDN numbers.
maxISDN-AddressLength INTEGER ::= 9
AlternativeDestinationAddress ::= CHOICE {
uriAddress                      [0] URI,
ipv4address                     [1] PDP-address,
ipv6address                     [2] PDP-address,
naiAddresss                     [3] NAI}
URI::= OCTET STRING (SIZE (1..maxURI-Length))
-- This type is used to represent a URI e.g. a SIP URI, a SIPS URI, etc
maxURI-Length INTEGER ::= 255
NAI ::= OCTET STRING (SIZE (1..maxNAI-Length))
-- This type is used to represent a URI e.g. a SIP URI, a SIPS URI, etc
maxNAI-Length INTEGER ::= 253
```

Or the URI and/or NAI information elements could be defined more structured, e.g.:

```
URI::= SEQUENCE {
uRI-Scheme            [0] URI-Scheme,
uRI-Authority         [1] URI-Authority       OPTIONAL,
uRI-Path              [2] URI-Path            OPTIONAL,
uRI-Query             [3] URI-Query           OPTIONAL,
uRI-Fragment          [4] URI-Fragment        OPTIONAL,
extensionContainer    [5] ExtensionContainer  OPTIONAL,
...}
URI-Scheme::= OCTET STRING (SIZE (1..maxURI-SchemeLength))
-- This type is used to represent the Scheme portion of a URI
```

Another representation of URI-Scheme is as follows:

```
URI-Scheme::= SEQUENCE{
uRI-coding-Scheme     [0] URI-coding-Scheme,
uRI-binary-code       [1] URI-binary-code     OPTIONAL,
uRI-octet             [2] URI-octet           OPTIONAL,
extensionContainer    [5] ExtensionContainer  OPTIONAL,
...}
URI-coding-Scheme ::= ENUMERATED {
binary-encoded (0),
octet-encoded (1),
...}
URI-binary-code::= ENUMERATED {
SIP-URI               (0),
Tel-URI               (1),
HTTP                  (2),
Sms                   (3) }
```

The above coding for URI-binary-code is just one example. Those skilled in the art will appreciate that a URI scheme may be identified by an enumerated value in other ways.

Another example for the coding of URI-binary-code is:

```
URI-binary-code::= BITSTRING{
SIP-URI               (0),
Tel-URI               (1),
HTTP                  (2),
Sms                   (3) } (SIZE(8..256))
```

In this case, the URI scheme is identified by a bit in a bit string.

```
maxURI-SchemeLength INTEGER ::= 255
URI-Authority ::= OCTET STRING (SIZE (1..maxURI-AuthorityLength))
-- This type is used to represent the Authority portion of a URI
maxURI-AuthorityLength INTEGER ::= 255
```

-continued

```
URI-Path ::= OCTET STRING (SIZE (1..maxURI-PathLength))
-- This type is used to represent the Path portion of a URI
maxURI-PathLength INTEGER ::= 255
URI-Query ::= OCTET STRING (SIZE (1..maxURI-QueryLength))
-- This type is used to represent the Query portion of a URI
maxURI-QueryLength INTEGER ::= 255
URI-Fragment ::= OCTET STRING (SIZE (1..maxURI-FragmentLength))
-- This type is used to represent the Fragment portion of a URI
maxURI-FragmentLength INTEGER ::= 255
NAI ::= SEQUENCE [55
userName              [0] UserName            OPTIONAL,
realm                 [1] Realm               OPTIONAL,
...[56
UserName ::= OCTET STRING (SIZE (1..maxUserNameLength))
-- This type is used to represent the username portion of an NAI
maxUserNameLength INTEGER ::= 253
Realm ::= OCTET STRING (SIZE (1..maxRealmLength))
-- This type is used to represent the realm portion of an NAI
maxRealmLength INTEGER ::= 253
```

Similar enhancements may be made to the other protocols listed in Tables 1a through 1e, with similar messaging and information elements (e.g., the "User-Identifier" attribute-value pair (AVP) in the Diameter Send-Routing-Info-for-SM-Request (SRR) command).

As mentioned above, the new information element that contains an identifier other than an MSISDN may be included in addition to or alternatively to the MSISDN information element, and the above discussion describes the case where the new information element is included in addition to the MSISDN information element. The new information element may be included alternatively to the MSISDN information element by providing a choice (i.e., an election or a determination to be made) at the sending network entity 112 between the existing MSISDN information element and one or more new information elements. Such an embodiment may be achieved in the MAP protocol by increasing the Application Context ("AC") version of the Application Context that contains the MAP-SEND-ROUTING-INFO-FOR-SM operation, that is, Short Message Gateway Services, which is also written as "shortMessageGatewayContext" and "shortMessageGatewayContextv1" (where the "v1" indicates version 1 of the AC, but may differ depending on the version of 3GPP TS 29.002, e.g., "v2", "v3", etc.).

Example #2 below provides an example of possible enhancements to the MAP protocol in 3GPP TS 29.002 to support a new information element as an alternative to the MSISDN.

Example #2

```
RoutingInfoForSM-Arg ::= SEQUENCE {
sm-DestinationAddress          [0] SM-AddressString,
sm-RP-PRI                      [1] BOOLEAN,
serviceCentreAddress           [2] AddressString,
extensionContainer             [6] ExtensionContainer       OPTIONAL,
gprsSupportIndicator           [7] NULL                     OPTIONAL,
-- gprsSupportIndicator is set only if the SMS-GMSC supports
-- receiving of two numbers from the HLR
sm-RP-MTI                      [8] SM-RP-MTI                OPTIONAL,
sm-RP-SMEA                     [9] SM-RP-SMEA               OPTIONAL,
sm-deliveryNotIntended         [10] SM-DeliveryNotIntended  OPTIONAL,
ip-sm-gwGuidanceIndicator      [11] NULL                              OPTIONAL,
... }
SM-AddressString::= CHOICE{
msisdn                         [0] ISDN-AddressString,
uriAddress                     [1] URI,
ipv4address                    [2] PDP-address,
ipv6address                    [3] PDP-address,
naiAddresss                    [4] NAI}
```

Similar enhancements may be made to the other protocols listed in Tables 1a through 1e, with similar messaging and information elements.

Upon receipt of message #1 140 from the sending network entity 112, the destination home network DB entity 122 may determine the identity of the target entity 134 whose routing information is being requested. The destination home network DB entity 122 may contain a database function or similar function that stores the relevant information (i.e., information indicative of the identity of the target entity 134). If the destination home network DB entity 122 contains the identity information for the target entity 134, the destination home network DB entity 122 returns the identity information in message #2 150 to the requesting sending network entity 112. For example, the destination home network DB entity 122 may return as the identity information a MAP-SEND-ROUTING-INFO-FOR-SM response/confirmation, a Diameter Send-Routing-Info-for-SM-Answer (SRA) command, or any of the other messages listed in Tables 1a through 1e as message #2. The protocol of message #2 150 may be, but is not limited to, the same protocol as that of message #1 140.

A third set of embodiments is directed to the methods and messages by which the destination home network 120 conveys, to the sending network 110, a preferred or mandatory delivery method or protocol for an SMS message that does not use an MSISDN as the destination address. The preferred or mandatory delivery method or protocol may be, but is not limited to, one or more of MAP, SMPP, RADIUS, Diameter, or SIP.

More specifically, the destination home network DB entity 122 in the home network 120 of the destination subscriber is interrogated or queried by the sending network entity 112 for information regarding the delivery method or protocol the sending network entity 112 should use for delivering an SMS message. That is, a query is made by the sending network entity 112 regarding the protocol to be used for message #3 160. The destination home network DB entity 122 provides a delivery protocol to the sending network entity 112 in a response to the query. If multiple possible delivery methods are conveyed in the response to the query, the order in which the methods should be attempted may optionally be conveyed such that if a selected delivery method fails, the next preferred delivery method is selected and used. The order of preference may be determined by the home network DB entity 122 or another entity in the destination home network 120.

That is, the sending network entity 112 sends message #1 140, optionally with an indicator, to the destination home network DB entity 122. The destination home network DB entity 122 receives message #1 140 and/or an indication within message #1 140. The indicator or the reception of the message itself may indicate to the destination home network DB entity 122 that a response containing one or more delivery methods or protocols for delivering SMS messages by the sending entity 112 is desired. The indicator and/or the reception of the message itself may indicate that, if the response contains multiple protocols, the protocols should be prioritized. Such a message may be combined with an existing query message, such as those listed in Tables 1a through 1e. One embodiment is to enhance the MAP protocol, and another embodiment is to enhance the Diameter protocol. Examples of such enhancements to the MAP protocol are given in Example #3, below.

In response to receiving message #1 140 and/or an indication within message #1 140, the destination home network DB entity 122 determines one or more delivery methods and sends message #2 150. Message #2 150 may optionally contain, among other information relevant to the type of message #1 140, one or more mandatory or preferred delivery methods for the sending network entity 112 to use in delivering SMS messages to the target entity 134. These mandatory or preferred delivery methods may also be referred to hereinafter as delivery methods, delivery protocols, or SMS message delivery protocols. The destination home network DB entity 122 or another component in the destination home network 120 may determine to utilize one or more mandatory or preferred delivery methods (i.e., SMS message delivery protocols) based on one or more factors. The one or more factors may include, but are not limited to, a parameter, an AVP, an indicator, or an information element received in message #1 140. For example, the information element may indicate an identity or an identifier of the sending network 110 and/or an identity or an identifier of the sending network entity 112, such as the source address of message #1 140 (e.g., an IP address, an E.164 address, a Global Title, a Point Code, a URI, or NAI). Additionally, or alternatively, the information element may include an address of the target entity 134 (i.e., a target entity address).

Another factor that may be utilized by the destination home network DB entity 122 or another component in the destination home network 120 to determine the one or more SMS message delivery protocols provided in message #2 150 is the status of the target entity 134, such as whether the target entity 134 is online (also referred to as registered) or offline (also referred to as deregistered, unregistered, or not registered). Another factor that may be utilized is whether the target entity 134 is able to receive SMS messages on registered domains (e.g., CS, PS, or IMS). Another factor that may be utilized is the status of memory in the target entity 134 for receiving or storing SMS messages. Another factor that may be utilized is the current location of the target entity 134. The current location of the target entity 134 may be based on an address of the destination serving network entity 132 where the target entity 134 is registered, a location area, a routing area, a cell identity, an MCC, an MNC, a GPS location, a domain name, a realm name, and/or a way point associated with the target entity 134.

Once the destination home network DB entity 122 determines one or more preferred delivery methods utilizing one or more of the factors discussed above, the destination home network DB entity 122 sends message #2 150 to the sending network entity 112 and includes, among other information relevant to the type of message #1 140, a protocol list indicating one or more of the determined mandatory or preferred delivery methods (i.e., SMS message delivery protocols). The one or more SMS message delivery protocols indicated in message #2 150 may be used to transmit message #3 160. If the protocol list contains only one entry (i.e., one SMS message delivery protocol), then this entry may indicate to the sending network entity 112 that the SMS message delivery protocol to be used is mandatory. Alternatively, an additional indicator, flag, identifier, AVP, or information element (which may reside within the protocol list) may indicate that that the SMS message delivery protocol is mandatory. If the protocol list contains more than one entry (i.e., a plurality of SMS message delivery protocols), then message #2 150 may include an indication of a priority of use associated with each SMS message delivery protocol contained within the protocol list.

For example, the entries may be placed in the protocol list in order of a respective priority associated with each protocol within the entries, or the priority of the protocols may be indicated by a numbering scheme (e.g., the number "1" indicating that a given entry contains the highest priority protocol and so on) or other indicators. Such a protocol list may convey delivery methods by the types of delivery addresses returned. For example, if a SIP URI is returned by the destination home network DB entity 122, then the sending network entity 112 may interpret this to imply using SIP/IMS to deliver its SMS messages to the target entity 134.

Message #2 150 may also contain additional information regarding preferred or mandatory delivery methods that may be needed by an underlying protocol of the SMS message delivery methods. This additional information may include such information as an IP address, a host name, a domain name, a fully qualified domain name, SS7-related addressing (such as a global title, a point code, an E.164 address, or an E.214 address), a URI, and/or an NAI. In some cases, this information may not identify the target entity 134 but instead may identify one or more components that serve as intermediary hops along a path between the sending network entity 112 and the target entity 134, such as the destination home network proxy entity 124 and/or the destination serving network entity 132. One embodiment is to enhance the MAP protocol, and another embodiment is to enhance the Diameter protocol. Examples of such enhancements to the MAP protocol are given in Example #4, below.

The sending network entity 112, after receiving a response from the destination home network DB entity 122 (e.g., Message #2 150), may then use an indicated delivery method to deliver the SMS message to the target entity 134. The delivery may be made via intermediary nodes, such as the destination home network proxy entity 124 and/or the destination serving network entity 132. In the case of multiple delivery methods being indicated with a specified order (i.e., a prioritization), multiple deliveries may be attempted one after another using the delivery methods in the order indicated.

The sending network entity 112 may cache or temporarily store information the sending network entity 112 has received regarding delivery methods in order to use this information for other SMS messages sent to the same target entity 134 or to target entities under the auspices of the same destination home network 120. A cache time may be requested in message #1 140, and/or an absolute or relative cache time may be conveyed in message #2 150. An indication of the applicability of the cached information may be conveyed. For example, the destination home network DB entity 122 may provide an indication that the cached information applies only to the target entity 134 or that the cached information applies to all target entities under the auspices of the destination home network 120. The absolute or relative timer value returned in message #2 150 may be applicable to all of the preferred protocol delivery methods, or there could be an individual absolute or relative timer value for each delivery method if multiple delivery methods are indicated in message #2 150.

Example #3 below provides possible enhancements to 3GPP TS 29.002 for message #1 140 in FIG. 1 that may be used in implementing embodiments related to determining a delivery method for an SMS message that may not include an MSISDN.

Example #3

```
RoutingInfoForSM-Arg ::= SEQUENCE {
    msisdn                  [0] ISDN-AddressString,
    sm-RP-PRI               [1] BOOLEAN,
    serviceCentreAddress    [2] AddressString,
    extensionContainer      [6] ExtensionContainer     OPTIONAL,
    ... ,
    gprsSupportIndicator    [7] NULL                   OPTIONAL,
    -- gprsSupportIndicator is set only if the SMS-GMSC supports
    -- receiving of two numbers from the HLR
    sm-RP-MTI               [8] SM-RP-MTI              OPTIONAL,
    sm-RP-SMEA              [9] SM-RP-SMEA             OPTIONAL,
    sm-deliveryNotIntended  [10] SM-DeliveryNotIntended OPTIONAL,
```

-continued

```
ip-sm-gwGuidanceIndicator        [11] NULL              OPTIONAL,
alternativeDeliveryMethodsSupported  [12] NULL          OPTIONAL }
```

Or:

```
RoutingInfoForSM-Arg ::= SEQUENCE {
msisdn                  [0] ISDN-AddressString,
sm-RP-PRI               [1] BOOLEAN,
serviceCentreAddress    [2] AddressString,
extensionContainer      [6] ExtensionContainer          OPTIONAL,
... ,
gprsSupportIndicator    [7] NULL                        OPTIONAL,
-- gprsSupportIndicator is set only if the SMS-GMSC supports
-- receiving of two numbers from the HLR
sm-RP-MTI               [8] SM-RP-MTI                   OPTIONAL,
sm-RP-SMEA              [9] SM-RP-SMEA                  OPTIONAL,
sm-deliveryNotIntended  [10] SM-DeliveryNotIntended     OPTIONAL,
ip-sm-gwGuidanceIndicator  [11] NULL                    OPTIONAL,
alternativeSMS-DeliveryMethodsSupported [12]            AlternativeSMS-
DeliveryMethods         OPTIONAL }
AlternativeSMS-DeliveryMethods::= SEQUENCE{
mapMethod               [0] AlternativeSMS-DeliveryPriority
OPTIONAL,
smppMethod              [1] AlternativeSMS-DeliveryPriority   OPTIONAL,
diameterMethod          [2] AlternativeSMS-DeliveryPriority   OPTIONAL,
sipMethod               [3] AlternativeSMS-DeliveryPriority
OPTIONAL,
...}
AlternativeSMS-DeliveryPriority::= INTEGER (0..100)
-- Where a value of 0 (zero) is least preferred and 100 is most preferred
-- other values are reserved for future use and shall be discarded if
-- received
```

Example #4 below provides possible enhancements to 3GPP TS 29.002 for message #2 150 in FIG. 1 that may be used in implementing embodiments related to determining a delivery method for an SMS message that may not include an MSISDN.

Example #4

```
RoutingInfoForSM-Res ::= SEQUENCE {
imsi                    IMSI,
locationInfoWithLMSI    [0] LocationInfoWithLMSI,
extensionContainer      [4] ExtensionContainer          OPTIONAL,
...,
ip-sm-gwGuidance        [5] IP-SM-GW-Guidance           OPTIONAL,
alternativeSMS-DeliveryMethodsToAttempt  [6]            AlternativeSMS-
DeliveryMethods         OPTIONAL }
IP-SM-GW-Guidance ::= SEQUENCE {
minimumDeliveryTimeValue      SM-DeliveryTimerValue,
recommendedDeliveryTimeValue  SM-DeliveryTimerValue,
extensionContainer            ExtensionContainer        OPTIONAL,
...}
LocationInfoWithLMSI ::= SEQUENCE {
networkNode-Number      [1] ISDN-AddressString,
lmsi                    LMSI                            OPTIONAL,
extensionContainer      ExtensionContainer              OPTIONAL,
...,
gprsNodeIndicator       [5] NULL                        OPTIONAL,
-- gprsNodeIndicator is set only if the SGSN number is sent as the
-- Network Node Number
additional-Number       [6] Additional-Number           OPTIONAL
-- NetworkNode-number can be either msc-number or sgsn-number or IP-SM-GW
-- number or SMS Router number
}
Additional-Number ::= CHOICE {
msc-Number              [0] ISDN-AddressString,
sgsn-Number             [1] ISDN-AddressString }
-- additional-number can be either msc-number or sgsn-number
-- if received networkNode-number is msc-number then the
-- additional number is sgsn-number
-- if received networkNode-number is sgsn-number then the
-- additional number is msc-number
```

The new IE of "alternativeSMS-DeliveryMethodsToAttempt" may alternatively be present within one of the other compound information elements that form the "RoutingInfoForSMS-Res", e.g., "IP-SM-GW-Guidance", "LocationInfoWithLMSI", "Additional-Number", etc.

Or:

```
RoutingInfoForSM-Res ::= SEQUENCE {
imsi                          IMSI,
locationInfoWithLMSI          [0] LocationInfoWithLMSI,
extensionContainer            [4] ExtensionContainer          OPTIONAL,
...,
ip-sm-gwGuidance              [5] IP-SM-GW-Guidance           OPTIONAL }
IP-SM-GW-Guidance ::= SEQUENCE {
minimumDeliveryTimeValue      SM-DeliveryTimerValue,
recommendedDeliveryTimeValue  SM-DeliveryTimerValue,
extensionContainer            ExtensionContainer              OPTIONAL,
...}
LocationInfoWithLMSI ::= SEQUENCE {
networkNode-Number            [1] ISDN-AddressString,
lmsi                          LMSI                            OPTIONAL,
extensionContainer            ExtensionContainer              OPTIONAL,
...,
gprsNodeIndicator             [5] NULL                        OPTIONAL,
-- gprsNodeIndicator is set only if the SGSN number is sent as the
-- Network Node Number
additional-Number             [6] Additional-Number           OPTIONAL,
-- NetworkNode-number can be either msc-number or sgsn-number or IP-SM-GW
-- number or SMS Router number
alternativeNodeAddresses      [7] AlternativeNodeAddresses    OPTIONAL
}
Additional-Number ::= CHOICE {
msc-Number                    [0] ISDN-AddressString,
sgsn-Number                   [1] ISDN-AddressString}
-- additional-number can be either msc-number or sgsn-number
-- if received networkNode-number is msc-number then the
-- additional number is sgsn-number
-- if received networkNode-number is sgsn-number then the
-- additional number is msc-number
AlternativeNodeAddresses::= SEQUENCE{
smppNodeAddress               [0] AlternativeNodeAddressWithPriority
OPTIONAL,
diameterNodeAddress           [1] AlternativeNodeAddressWithPriority
OPTIONAL,
sipNodeAddress                [2] AlternativeNodeAddressWithPriority
OPTIONAL,
...}
AlternativeNodeAddressWithPriority::= SEQUENCE{
alternativeNodeAddress        [0] AlternativeNodeAddress,
Priority                      [1] ISDN-AddressString,
...}
AlternativeNodeAddress::= CHOICE{
fqdn                          [0] FQDN,
uriAddress                    [1] URI,
ipv4address                   [2] PDP-address,
ipv6address                   [3] PDP-address,
e164OrE214Address             [4] ISDN-AddressString,
naiAddresss                   [5] NAI}
FQDN ::= OCTET STRING (SIZE (9..255))
```

Similar enhancements may be made to the other protocols listed in Tables 1a through 1e, with similar messaging and information elements.

A fourth set of embodiments is directed to conveying (e.g., transmitting) routable alphanumeric addresses to the target entity 134. More specifically, methods and messages are provided for conveying, to the target entity 134, a target address that an incoming SMS message was targeted to when the incoming SMS message was not targeted to an MSISDN or any other type of address currently contemplated. Instead, the target address may be a URI, an NAI, a host name and domain name (also known as an FQDN), or an IP address. Such an address will be referred to hereinafter as a routable alphanumeric address.

Under this fourth set of embodiments, three embodiments related to transmitting a routable alphanumeric address will be discussed. The first embodiment is directed to transmitting a routable alphanumeric address by enhancing existing address fields. The second embodiment is directed to transmitting a routable alphanumeric address by replacing existing address fields. The third embodiment is directed to transmitting a routable alphanumeric address to an entity that may not be able to process the routable alphanumeric address.

In the first embodiment, routable alphanumeric addresses for originating addresses and/or destination addresses are conveyed to the target entity 134 by including the addresses in an existing field or information element within an SMS message, such as in the short message transfer layer (SM-TL) of the SMS protocol.

In an embodiment, the sending network entity 112 places a routable alphanumeric originating address in the transfer layer protocol originating address (TP-OA) field of the SMS message and places a routable alphanumeric destination address in the transfer layer protocol destination address (TP-DA) field of the SMS message. Since the TP-OA field and the TP-DA field use the same format, a common solution can be found for both the TP-OA and TP-DA fields. In order to include characters not included in the GSM 7-bit Default Alphabet table and Default Extension table in the TP-OA field, the sending network entity 112 may use an alternative character encoding scheme. Examples of such alternative character encoding schemes include ASCII, UTF-8, and the GSM 7-bit Default Alphabet (optionally with the GSM 7-bit Default Alphabet Extension Table), GSM 7-bit National Language Single Shift Table (optionally with a GSM 7-bit National Language Locking Shift Table). Alternatively or additionally, a field other than the TP-OA field may be used, such as a new or alternative TP-User Data Header field or even text within the TP-User Data field. The TP-OA field may contain an indication that the value in this additional or alternative field applies alternatively or additionally to a value in the TP-OA field. Therefore, a routable alphanumeric address containing a superset of characters of those defined in the GSM 7-bit Default Alphabet table and Default Extension table may be placed in the TP-OA and/or the TP-DA.

If the length of the entire routable alphanumeric address permits, the sending network entity 112 may place the entire routable alphanumeric address in the TP-OA and/or the TP-DA. If the entire routable alphanumeric address does not "fit" (i.e., the length of the entire routable alphanumeric address exceeds an available length allotted) in the TP-OA and/or the TP-DA, the sending network entity 112 may place a portion of the routable alphanumeric address in the TP-OA and/or the TP-DA, and the sending network entity 112 may place the remainder of the routable alphanumeric address elsewhere, such as in a new TP-UDH field.

In addition to the character encoding solutions described above, an indication of the type of address may be included as a code point in a parameter, an indicator, or an information element or may be included natively in the address as per the rules for that address. For example, for SIP URIs, the address may be "sip:user@example.com" where the "sip:" part denotes that a SIP URI is present. Example #5 in FIG. 2 provides an example coding of possible enhancements to the SMS protocol defined in 3GPP TS 23.040 that may be used in implementing this embodiment.

It should be noted that, in Example #5, the URI, the NAI, and the FQDN, instead of being encoded using UCS2, may be encoded using the GSM 7-bit Default Alphabet (optionally with the GSM 7-bit Default Alphabet Extension Table) or the GSM 7-bit National Language tables using the Locking Shift Table and Single Shift Table as conveyed in the National Language Identifiers in the first two octets of the Address Value or coded according to the GSM 7-bit National Language tables using the National Language Identifiers conveyed in the IEI fields for the Locking Shift Table and/or Single Shift Table in the TP User Data Header (TP-UDH) field.

URIs, NAIs, and FQDNs that are too long to fit into the TP-OA/TP-DA field may be included in the TP-OA/TP-DA field in part. For example, the first x number of characters may be placed into TP-OA/TP-DA, where x is the number of characters that can be placed into the TP-OA/TP-DA field according to the character encoding scheme used. The rest (i.e., the remaining or remainder) of the characters may be encoded in an alternative place. That is, the rest of the characters may be placed in one of a new or existing TP-User-Data-Header field in the SMS header, in delimited text in the message body (such as in the TP-User-Data field), in another field within the SM-TL layer, or in an electronic business card (e.g., a vCard) or email header object. Alternatively, the entire address may be encoded in the alternative place.

IP addresses may be encoded as alphanumeric as specified above for URIs, NAIs, and FQDNs, including the methods described for when the URI, NAI, or FQDN is too long to fit into the TP-OA/TP-DA field. Alternatively, IP addresses may be encoded more succinctly. For example, a code point may denote that what is in the Address-Value part of the TP-OA/TP-DA field is an IPv4 address or IPv6 address prefix, and the four bytes/octets of an IPv4 address or the eight bytes/octets of an IPv6 address prefix may then be placed in the Address-Value part as an "Octet representation" of the TP-OA/TP-DA field. Optionally, the remaining eight octets of the IPv6 address (also known as the interface identifier) may be placed in an alternative place, such as those described above, or the first two octets may be encoded along with the IPv6 address prefix in the TP-OA or TP-DA field and the remaining six octets may be placed in an alternative place, such as those described above. An example coding of possible enhancements to 3GPP TS 23.040 that may be used in implementing this embodiment is provided in Example #6 in FIG. 3.

If the SMS-TL protocol is enhanced by the methods described above, then the outer/higher layer protocols used to deliver an SMS message through a legacy system may also need to be enhanced if the originating address and/or the destination address from the SMS message are copied or reused.

For MAP, the SM-RP-DA in the MT-ForwardSM-Arg message cannot be extended due to the absence of an ASN.1 ellipsis (" . . . ") in the SM-RP-DA information element ASN.1 syntax definition. Therefore, the relevant MAP Application Context may need a version "increase" (i.e., an update or a revision). An example of a possible enhancement to the MAP protocol is shown in Example #7 below.

Example #7

```
MT-ForwardSM-Arg ::= SEQUENCE {
sm-RP-DA                SM-RP-DA,
sm-RP-OA                SM-RP-OA,
sm-RP-UI                SignalInfo,
moreMessagesToSend      NULL                    OPTIONAL,
extensionContainer      ExtensionContainer      OPTIONAL,
...,
smDeliveryTimer         SM-DeliveryTimerValue   OPTIONAL,
smDeliveryStartTime     Time                    OPTIONAL }
-- SM-DeliveryTimerVelue contains the value used by the SMS-GMSC
MT-ForwardSM-Res ::= SEQUENCE {
sm-RP-UI                SignalInfo              OPTIONAL,
extensionContainer      ExtensionContainer      OPTIONAL,
...}
SM-RP-DA ::= CHOICE {
imsi                    [0] IMSI,
lmsi                    [1] LMSI,
serviceCentreAddressDA  [4] AddressString,
noSM-RP-DA              [5] NULL}
SM-RP-OA ::= CHOICE {
msisdn                  [2] ISDN-AddressString,
sm-DestinationAddress   [2] SM-AddressString,
serviceCentreAddressOA  [4] AddressString,
noSM-RP-OA              [5] NULL}
```

Since SIP can already convey IP addresses and SIP URIs, then if the routable alphanumeric address in the SMS message is an IP address or a SIP URI, the IP address or the SIP URI can be directly copied or reused in the relevant SIP headers, such as "To", "Request-URI", "From", or "P-Asserted-Identity", or in one or more new SIP headers specifically created to carry one or more addresses from the SMS message. Thus, the SMS message, complete with the enhancements described above, may be encapsulated in the SIP message unchanged and the SIP headers may be configured with the originating address and/or destination address in the encapsulated SMS message.

If the routable alphanumeric address in the SMS message is not an IP address or a SIP URI, then one or more of the following may be applied: the existing SIP headers may be enhanced to allow for additional address types such as non-SIP URIs, URLs, or NAIs; one or more new SIP headers may be defined to carry one or more addresses from the SMS message; or an alternative address that is acceptable to SIP may be provided by applying the embodiments described below with regard to entities that may not be able to process a routable alphanumeric address. The alternative address that is acceptable to SIP may be, for example, a SIP URI or an MSISDN/E.164 number, which may be represented in SIP by a Tel URI or a SIP URI having a "user=phone" parameter.

A second embodiment under this fourth set of embodiments is directed to replacing existing address fields. In this embodiment, routable alphanumeric addresses for originating addresses and destination addresses are conveyed to the target entity 134 by including the addresses in a new field or a new information element within an SMS message such as in the SM-TL of the SMS protocol.

As described above, the existing SMS message structure including the TP-DA and/or TP-OA fields may be used to convey a routable alphanumeric address. However, instead of using the existing information elements of TP-OA and TP-DA and extending the code points therein, in this embodiment new information elements with new code points are provided. An SMS message containing such a new information element will be referred to hereinafter as an enhanced SMS message.

In an embodiment, an enhanced SMS message is realized by including an enhanced address field format within the TP-OA address field and within the TP-DA address field. The enhanced address field format allows for alphanumeric addresses to be included in addition to existing addressing. Example #8 in FIG. 4 shows an example of possible enhancements to 3GPP TS 23.040 to define a new format for address fields in enhanced SMS messages and how such enhancements may be added to the SM-TL protocol. Note that in Example #8 the maximum length of the full address field (Address-Length, Type-of-Address, and Address-Value) is 130 octets.

Alternatively to the above example, the maximum length of the full address field (Address-Length, Type-of-Address, and Address-Value) may be extended to a greater number by one or more of: increasing the size of the Address-Length field, for example increasing the size of the Address-Length field to two octets; changing the meaning of the Address-Length field to convey (i.e., indicate) the number of octets rather than the number of semi-octets; or using a different encoding for alphanumeric addresses. In the case of using a different encoding for alphanumeric addresses, an encoding scheme may be used that uses fewer bits than the proposed scheme of UCS2, which uses 16 bits. Examples of encoding schemes that use fewer bits than the proposed scheme of UCS2 include ASCII, UTF-8, the GSM 7-bit Default Alphabet (optionally with the GSM 7-bit Default Alphabet Extension Table), and the GSM 7-bit National Language Single Shift Table (optionally with a GSM 7-bit National Language Locking Shift Table). The encodings provided in Example #5 herein and Example #6 herein may also be used.

If the SMS message structure is enhanced by inserting one or more new information elements that are not compatible with existing technologies/deployments, it may be beneficial for the insertion to be done in such a way that if a non-enhanced target entity receives an enhanced SMS message, the target entity will ignore the new information elements and continue normal operation rather than producing undesirable effects. In order for the target entity and any intermediary entities along the path, such as a destination home network proxy entity or a destination serving network entity, to correctly understand and process enhanced SMS messages, a new message type (also known as "PDU Type", "TPDU", or "PDU") may need to be defined.

A plurality of existing message types are defined in 3GPP TS 23.040. In an embodiment, for each existing message type, a new extended message type may be defined such that the new message type implies a specific syntax when received by any entity, such as a target entity. The new message type may be referred to by names such as SMS-EDELIVER or SMS-ESUBMIT, where the "E" indicates that the message has been extended. However, one skilled in the art will appreciate that the name of any new message type may be any valid string of characters. An indication may be provided to the new message type such that when an enhanced SMS message is received by a target entity whose software is unable to decode the enhanced SMS message, the target entity refrains from processing the enhanced SMS message, stores the enhanced SMS message exactly as received, and continues normal behavior rather than producing undesirable effects by attempting to process the enhanced SMS message. Example #9 below shows possible enhancements to 3GPP TS 23.040 for defining a new message type in enhanced SMS messages that may be added to the SM-TL protocol.

Example #9

9.2.3 Definition of the TPDU parameters
9.2.3.1 TP-Message-Type-Indicator (TP-MTI)
The TP-Message-Type-Indicator is a 2-bit field, located within bits no 0 and 1 of the first octet of all PDUs which can be given the following values:

| bit1 | bit0 | Message type |
|---|---|---|
| 0 | 0 | SMS-DELIVER (in the direction SC to MS) |
| 0 | 0 | SMS-DELIVER REPORT (in the direction MS to SC) |
| 1 | 0 | SMS-STATUS-REPORT (in the direction SC to MS) |
| 1 | 0 | SMS-COMMAND (in the direction MS to SC) |
| 0 | 1 | SMS-SUBMIT (in the direction MS to SC) |
| 0 | 1 | SMS-SUBMIT-REPORT (in the direction SC to MS) |
| 1 | 1 | <u>SMS-DELIVER-EXTENDED (in the direction SC (inthedirectionSCtoMS)</u> |

If an MS receives a TPDU with a "Reserved" value in the TP-MTI it shall process the message as if it were an "SMS-DELIVER" but store the message exactly as received.

Or same as above but with the following:

9.2.3 Definition of the TPDU parameters
9.2.3.1 TP-Message-Type-Indicator (TP-MTI)
The TP-Message-Type-Indicator is a 2-bit field, located within bits no 0 and 1 of the first octet of all PDUs which can be given the following values:

| bit1 | bit0 | Message type |
|---|---|---|
| 0 | 0 | SMS-DELIVER (in the direction SC to MS) |
| 0 | 0 | SMS-DELIVER REPORT (in the direction MS to SC) |
| 1 | 0 | SMS-STATUS-REPORT (in the direction SC to MS) |

9.2.3 Definition of the TPDU parameters
9.2.3.1 TP-Message-Type-Indicator (TP-MTI)

The TP-Message-Type-Indicator is a 2-bit field, located within bits no 0 and 1 of the first octet of all PDUs which can be given the following values:

| bit1 | bit0 | Message type |
|---|---|---|
| 1 | 0 | SMS-COMMAND (in the direction MS to SC) |
| 0 | 1 | SMS-SUBMIT (in the direction MS to SC) |
| 0 | 1 | SMS-SUBMIT-REPORT (in the direction SC to MS) |
| 1 | 1 | TP-MESSAGE-TYPE-EXTENSION |

If an MS receives a TPDU with a value of 11 in the TP-MTI it shall process the following octet as follows:

| 8...0 | |
|---|---|
| 00000000 | SMS-DELIVER-EXTENDED(inthedirectionSC toMS) |
| 00000001to 11111111 | RESERVED |

If the MS does not understand the value of 11, then it will process the message as if it were an "SMS-DELIVER" but store the message exactly as received, as per previous versions of the present document.

Figure 5:
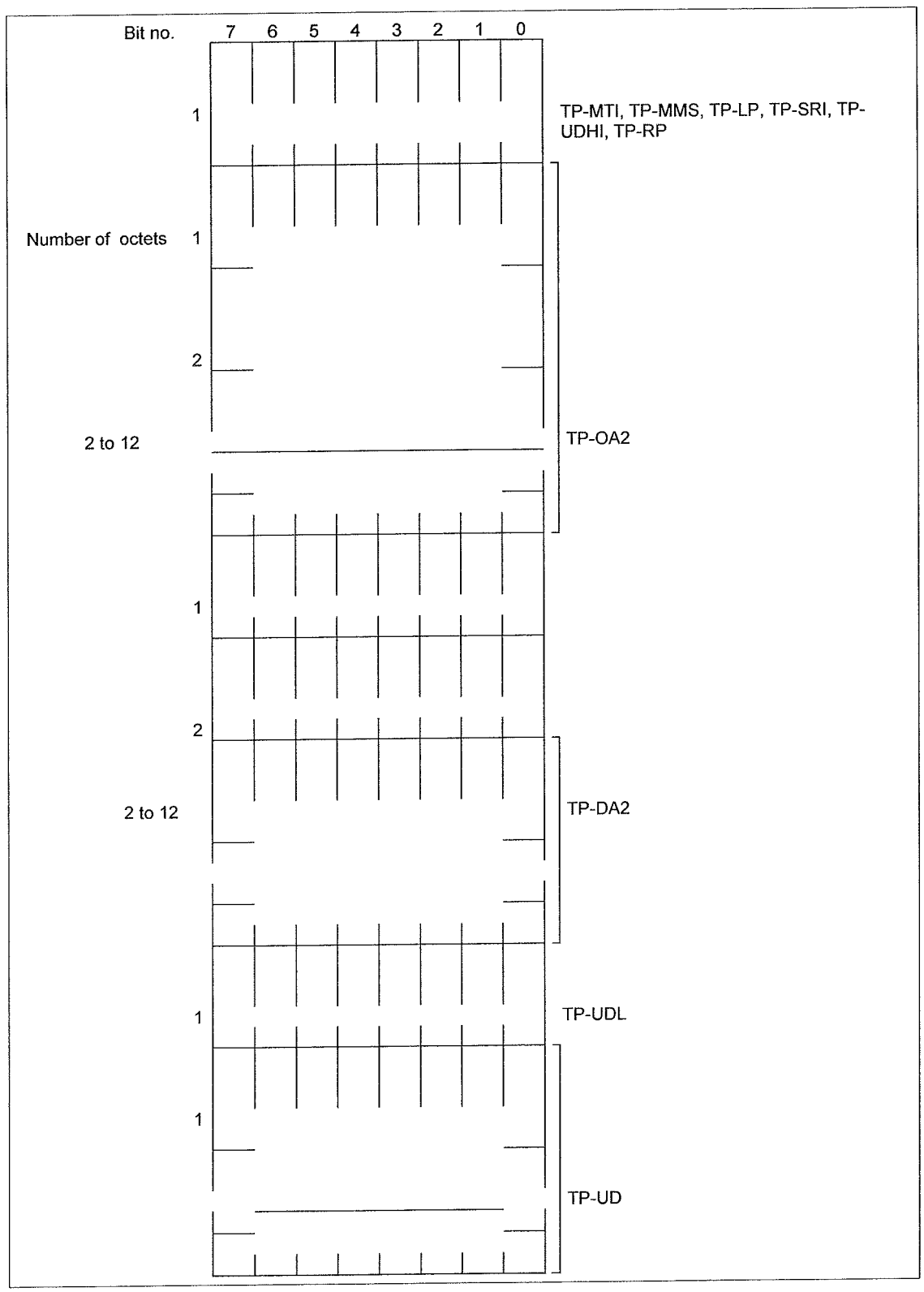
FIG. 5 illustrates possible enhancements to 3GPP TS 23.040 for defining new information elements in a new message type, according to one embodiment.

In the new message type, a list of included information elements, parameters, or fields may be defined. Since backwards compatibility (i.e., the new message type can be processed and utilized by existing technologies/deployments/target entities) is already assured by the fact that the message type is new rather than a previously defined message type, no legacy information elements need to be included. However, if a new message type is an enhancement of an already defined message type, then it may be beneficial to include as many of the information elements from the associated legacy message type as possible. This may ease implementation in the relevant network nodes, such as the destination home network proxy entity 124 or the destination serving network entity 132, and in the target entity 134. Example #10 in FIG. 5 shows possible enhancements to 3GPP TS 23.040 for defining the new information elements in the new message type as defined in Example #9. As can be seen, all information elements from the associated legacy message type are included apart from the addressing-related information element TP-OA. The addressing information elements TP-OA2 and TP-DA2 are new to this message type.

Those skilled in the art will appreciate that the representation in Example #10 is just one example and that the position and ordering of the information elements, including the TP-OA2 and TP-DA2 information elements, may differ from that presented In Example #10. In addition, those skilled in the art will appreciate that only one of the TP-OA2 or the TP-DA2 may be included. For example, the TP-OA2 may be preferably included for to provide enhanced alignment with the associated legacy message type of SMS-DELIVER.

The new information elements, TP-OA2 and TP-DA2, may have a structure that may be non-backwards compatible with TP-OA and TP-DA. For example, address types or formats may be included in addition to or instead of those already defined for TP-OA and TP-DA. Such a definition may be that as provided in Example #8. Example #11 below shows possible enhancements to 3GPP TS 23.040 for defining the structure or format for the new TP-OA2 and TP-DA2 address fields, information elements, or parameters.

Example #11

9.2.3.7 TP-Originating-Address (TP-OA)

The TP-Originating-Address field is formatted according to the formatting rules of address fields as defined in clause 9.1.2.5.

The first '#' encountered in TP-OA indicates where the address for SMSC routing purposes is terminated. Additional '*'s or '#'s can be present in the following digits, and all these digits including the first '#' are subaddress digits.

9.2.3.7a TP-Originating-Address2 (TP-OA2)

The TP-Originating-Address2 field is formatted according to the formatting rules of enhanced address fields as defined in clause 9.1.2.6.

The first '#' encountered in a non-alphanumeric address in the TP-OA2 indicates where the address for SMSC routing purposes is terminated. Additional '*'s or '#'s can be present in the following digits, and all these digits including the first '#' are subaddress digits.

9.2.3.8 TP-Destination-Address (TP-DA)

The TP-Destination-Address field is formatted according to the formatting rules of address fields as defined in clause 9.1.2.5.

The first '#' encountered in TP-DA indicates where the address for SMSC routing purposes is terminated. Additional '*'s or '#'s can be present in the following digits, and all these digits including the first '#' are subaddress digits.

9.2.3.8a TP-Destination-Address2 (TP-DA2)

The TP-Destination-Address field is formatted according to the formatting rules of enhanced address fields as defined in clause 9.1.2.5.

The first '#' encountered in a non-alphanumeric address in the TP-DA2 indicates where the address for SMSC routing purposes is terminated. Additional '*'s or '#'s can be present in the following digits, and all these digits including the first '#' are subaddress digits.

An enhanced SMS message may be beneficial to certain SMS target entity types, such as machine-to-machine (M2M) or machine type communication (MTC) target entity types, since new infrastructure may already be required in the mobile cellular system to support such target entities. The legacy SMS system components may be left as-is in order to support existing target entities, such as target entities other than M2M or MTC target entity types.

In other words, in these first and second embodiments under the fourth set of embodiments, a sending network entity may include an alphanumeric address as an originating address of an SMS message intended for a target entity. The alphanumeric address may be addressable by the target entity and may be an identifier other than an MSISDN number, such as a URI, a URL, an NAI, a domain name, or an IP address. The alphanumeric address may be included in a TP-OA field in the SMS message and/or in a field added to the SMS message in addition to existing SMS message fields. A first set of characters of the alphanumeric address may be included in the TP-OA field based on a character encoding scheme of the SMS message, and a second set of characters of the alphanumeric address may be included in a field other than the TP-OA field. In various embodiments, a string of characters within the first set of characters of the alphanumeric address and a string of characters within the second set of characters of the alphanumeric address may be separate and distinct from each other (i.e., mutually exclusive, non-overlapping) or may be overlapping (i.e., shared, common) with each other.

The field other than the TP-OA field may be a TP-User-Data-Header field, delimited text in a TP-User-Data field, another field within the SM-TL, an electronic business card or an email header object. The alphanumeric address may be an IP address, and the IP address may be included in an Address-Value portion of the TP-OA field. A code point of the TP-OA field may indicate that the Address-Value portion contains the IP address.

A third embodiment under this fourth set of embodiments is directed to delivering routable alphanumeric addresses to a target entity residing on a destination serving network that does not support routable alphanumeric addresses and/or that performs a security check on addresses. More specifically, in this embodiment, routable alphanumeric addresses for originating and destination addresses are conveyed to the target entity 134 by including the addresses in ways that are invisible to destination serving network entities, such as the destination serving network entity 132.

Some destination serving network entities may not accept delivery of an SMS message if the SMS message and/or the outer-layer or higher-layer protocol, such as those listed in Tables 1a through 1e, contain address fields that include new address types, such as routable alphanumeric addresses. Such destination serving network entities may have unknown or undesirable behavior when receiving such SMS messages that are to be delivered to a target entity. Such outer-layer or higher-layer protocols will be referred to hereinafter as higher-layer protocols.

The support or non-support by the destination serving network entity 132 for routable alphanumeric addresses may be determined at the destination home network 120 in various ways, depending on the node in the destination home network 120. At the destination home network DB entity 122, the support or non-support may be determined by an analysis of an address or other identifying information associated with the destination serving network entity 132 and a pre-configured set of data of those destination serving network entities that do and/or do not indicate support for routable alphanumeric addresses. Alternatively or additionally, the support or non-support may be determined by the presence or absence or value of a flag, indicator, or information element in messaging received by the destination home network DB entity 122 from the destination serving network entity 132. The flag, indicator, or information element may be included in, for instance, a MAP_UPDATE_LOCATION request/indication message, a MAP_UPDATE_GPRS_LOCATION request/indication message, a MAP-INSERT-SUBSCRIBER-DATA response/confirm message, and/or a Diameter Update-Location-Request message.

At the destination home network proxy entity 124, the support or non-support for routable alphanumeric addresses may be determined by an analysis of an address or other identifying information associated with the destination serving network entity 132 and a pre-configured set of data of those destination serving network entities that do or do not indicate support for alphanumeric routable addresses. The address or other identifying information may be received by the destination home network proxy entity 124 in, for instance, a MAP-SEND-ROUTING-INFO-FOR-SM response/confirm message from the destination home network DB entity 122. Alternatively or additionally, the support or non-support may be determined by the presence or absence or value of a flag, an indicator, or an information element in messaging received by the destination home network proxy entity 124 from the destination home network DB entity 122. The flag, indicator, or information element may be included in, for instance, a MAP-SEND-ROUTING-INFO-FOR-SM response/confirm message that may have originally been present in a message received by the destination home network DB entity 122 from the destination serving network entity 132, such as a MAP_UPDATE_LOCATION request/indication message, a MAP_UPDATE_GPRS_LOCATION request/indication message, a MAP-INSERT-SUBSCRIBER-DATA response/confirm message, and/or a Diameter Update-Location-Request message.

In addition to a lack of support for routable alphanumeric addresses, a destination serving network entity may provide a "security check" whereby, when the destination serving network entity receives an SMS message, the entity (or another entity on the entity's behalf) performs a comparison of the address fields in the higher-layer protocol of the SMS message with the address fields of the SMS message contained therein (e.g., in the SM-TL protocol). If the comparison fails, that is, if the addresses in the different protocol layers do not match, then the destination serving network entity may refuse or fail to deliver the SMS message to a target entity.

Whether or not the destination serving network entity 132 uses such a security check may be determined at the destination home network 120 in various ways, depending on the node in the destination home network 120 or in the sending network 110. At the destination home network DB entity 122, such a determination regarding the use of the security check may be made by an analysis of an address or other identity of the destination serving network entity 132 and a pre-configured set of data of those destination serving network entities that do or do not use such a security check. Alternatively or additionally, such a determination may be made by the presence or absence or value of a flag, indicator, or information element in messaging received by the destination home network DB entity 122 from the destination serving network entity 132. The flag, indicator, or information element may be included in, for instance, a MAP_UPDATE_LOCATION request/indication message, a MAP_UPDATE_GPRS_LOCATION request/indication message, a MAP-INSERT-SUBSCRIBER-DATA response/confirm message, and/or a Diameter Update-Location-Request message previously received by the destination home network DB entity 122 from the destination serving network entity 132.

At the sending network entity 112 and the destination home network proxy entity 124, the determination of whether the destination serving network entity 132 uses such a security check may be made by an analysis of an address or other identity of the destination serving network entity 132 and a pre-configured set of data of those destination serving network entities that do or do not use such a security check. The address or other identity may be received by the sending network entity 112 or by the destination home network proxy entity 124 in, for instance, a MAP-SEND-ROUTING-INFO-FOR-SM response/confirm message or a Diameter Send-Routing-Info-for-SM-Request/Answer (SRR/SRA) message from the home network DB entity 122. Alternatively or additionally, such a determination regarding the use of the security check may be made by the presence or absence or value of a flag, an indicator, or an information element in messaging received by the sending network entity 112 or by the destination home network proxy entity 124 from the destination home network DB entity 122. The flag, indicator, or information element may be included in, for instance, a MAP-SEND-ROUTING-INFO-FOR-SM response/confirm message or a Diameter Send-Routing-Info-for-SM-Request/Answer (SRR/SRA) message that may have originally been present in a message received by the destination home network DB entity 122 from the destination serving network entity 132, such as a MAP_UPDATE_LOCATION request/indication message, a MAP_UPDATE_GPRS_LOCATION request/indication message, a MAP-INSERT-SUBSCRIBER-DATA response/confirm message, and/or a Diameter Update-Location-Request message.

Measures may need to be taken to ensure delivery of SMS messages to a target entity that is residing on or attached to a destination serving network entity that may not have been upgraded to process routable alphanumeric addresses in SMS messages and/or that may perform the security check described above. In an embodiment, an acceptable alternative address, such as an address in compliance with ITU-T E.164, may be used instead of the routable alphanumeric address. An alternative address may be used in an SMS message (e.g., in the SM-TL layer protocol), in a higher-layer protocol of message #3 160 of FIG. 1, or in both the SMS message and the higher-layer protocol. If the destination serving network entity 132 on which the target entity 134 is currently residing is known to perform the above described security check or if it is unknown whether the destination serving network entity 132 performs the security check, the alternative address may be used. The alternative address may be of a format or type that is currently supported in the SMS message address fields of TP-DA and TP-OA (e.g., as defined in 3GPP TS 23.040).

If the destination serving network entity 132 is known (i.e., has been determined) to not perform the security check, then the alternative address format may be of a type not supported in the SMS message address fields of TP-DA and TP-OA but may need to be of a type currently supported in the relevant fields of the relevant messaging of the existing higher-layer protocol that is to be used for delivering the SMS message. Table 2 below provides such types of addresses that are currently acceptable in the relevant fields in existing SMS-related messaging in existing higher-layer protocols.

TABLE 2

| Protocol | Types of addresses that are currently acceptable for existing SMS related messaging |
|---|---|
| MAP | E.164 compliant addresses (e.g. MSISDN) encoded as per ASN.1 definition |
| SMPP | MSISDN |
| RADIUS | SMS not supported/defined |
| Diameter | SMS not supported/defined |
| SIP | E.164 compliant addresses (e.g. MSISDN) encoded as a Tel URI or a SIP URI with the "user = phone" SIP URI parameter<br>SIP URIs of type user@domain, where "domain" is an FQDN, an IPv4 address, or an IPv6 address |

The value assigned to an alternative address may be an address already assigned to the target entity 134, such as an MSISDN, or may be an address assigned to the target entity 134 on an as-needed (i.e., dynamic), temporary basis. The latter type of address will be referred to hereinafter as a temporary address.

In an embodiment, the temporary address is assigned to the target entity 134 by the destination home network DB entity 122 when the destination serving network entity 132 first informs the destination home network DB entity 122 of the presence of the target entity 134, e.g., when the destination serving network entity 132 attempts to fetch information regarding the target entity 134. Such an attempt may be made, for example, at a location update, location area update, tracking area update, or routing area update. The destination home network DB entity 122 may determine to make such an attempt upon receiving, for example, a MAP_UPDATE_LOCATION request/indication message, a MAP_UPDATE_GPRS_LOCATION request/indication message, and/or a Diameter Update-Location-Request message.

In an embodiment, the temporary address is released when the destination home network DB entity 122 is informed of the target entity 134 moving or registering to a new destination serving network entity that does support routable alphanumeric addresses. The destination home network DB entity 122 may be informed of such a move or registration by receiving, for example, a MAP_UPDATE_LOCATION request/indication message, a MAP_UPDATE_GPRS_LOCATION request/indication message, and/or a Diameter Update-Location-Request message from a different destination serving network entity. The fact that the destination serving network entity is different may be determined, for example, by the source address of the requesting entity. If the destination home network DB entity 122 is not informed of such a move or registration, the temporary address may be retained for further use.

The temporary address may need to be used if there is not an address already assigned to the target entity 134 that is likely to be acceptable to the destination serving network entity 132, such as an MSISDN. Otherwise, use of the temporary address is optional.

More specifically, the following steps may occur in the replacement of a routable alphanumeric address with an alternative address by the destination home network DB entity 122. In a first step, the sending network entity 112 sends message #1 140 to the destination home network DB entity 122 to obtain SMS routing information for the target entity 134.

In a second step, upon receiving message #1 140, the destination home network DB entity 122 then sends message #2 150 to the sending network entity 112 and includes in the message one or more assigned or obtained alternative addresses, one or more of which may be temporary addresses. For example, the destination home network DB entity 122 may assign or obtain an alternative originating address and/or an alternative destination address to be used temporarily for the target entity 134. The alternative address or addresses may be obtained, for example, from an internal or external database function or node, from a look-up table, or by means of an IN (Intelligent Networks) request and response to an IN Server, CAMEL Server, or gsmSCF, for instance by utilizing the MT-SMS-CSI described in 3GPP TS 23.078 and associated CAP messaging described in 3GPP TS 29.078. The destination home network DB entity 122 may ensure that, if an alternative address is a temporary address, then the temporary address is not currently assigned to another target entity.

In a third step, upon receiving message #2 150, the sending network entity 112 replaces the current originating address and/or destination address with an alternative originating address and/or destination address received in message #2 150. The alternative address is placed in SMS message #3 160 that is to be delivered to the target entity 134. The sending network entity 112 then sends message #3a 160a or message #3c 160c and includes the SMS message that contains the alternative address as the destination address. The sending network entity 112 may also use a received alternative address in place of a current originating and/or destination address in a field of a higher-layer protocol (e.g., the higher-layer protocols described in Tables 1a-1d) outside of the SMS message.

In a fourth step, upon receiving the SMS message in message #3d 160*d*, the target entity 134 may determine that the address or value in the originating address field and/or the address or value in the destination address field is an alternative address and may exchange the alternative address for the formerly included originating address and/or destination address. The target entity 134 may determine that an address is an alternative address by, for example, initiating a request, look-up, or query to an external entity that may be located in the destination home network 120. The target entity 134 may then receive a response that contains the formerly included originating address and/or destination address. A local set of data at the target entity 134 may contain previously configured or cached data from a request, look-up, or query.

The following steps may occur in the replacement of a routable alphanumeric address with an alternative address by the destination home network proxy entity 124. In a first step, the sending network entity 112 sends message #3a 160*a* to the destination home network proxy entity 124. Message #3a 160*a* contains an identifier that identifies the target entity 134 (e.g., message #3a 160*a* may instruct the destination home network proxy entity 124 to send an SMS message to the target entity 134).

In a second step, upon receiving message #3a 160*a*, the destination home network proxy entity 124 assigns or obtains one or more alternative addresses to be used for the target entity 134 as an originating address and/or a destination address. The alternative address may be obtained, for example, from the destination home network DB entity 122, from an internal or external database function or node, from a look-up table, or by means of an IN request and response to an IN Server, CAMEL Server, or gsmSCF, for instance by utilizing the MT-SMS-CSI and associated CAP messaging. The destination home network proxy entity 124 may ensure that, if an alternative address is a temporary address, then the temporary address is not currently assigned to another target entity. The destination home network proxy entity 124 then replaces the current originating address and/or destination address with an alternative originating address and/or destination address. The alternative originating address and/or destination address is placed in SMS message #3b 160*b* that is to be delivered to the target entity 134. The destination home network proxy entity 124 then sends message #3b 160*b* to the destination serving network entity 132 and includes the SMS message that contains the alternative address as the destination address. The destination home network proxy entity 124 may also use a received alternative address in place of a current originating and/or destination address in a field of a higher-layer protocol (e.g., the higher-layer protocols described in Tables 1a-1d) outside of the SMS message.

In a third step, upon receiving message #3b 160*b*, the destination serving network entity 132 delivers the received SMS message to the target entity 134 by sending message #3d 160*d* to the target entity 134. This sending of message #3d 160*d* occurs according to standard procedures.

In a fourth step, upon receiving the SMS message in message #3d 160*d*, the target entity 134 may recognize the address or value in the originating address field and/or the address or value in the destination address field as an alternative address and exchange the alternative address for the formerly included originating address and/or destination address. The target entity 134 may recognize an address as an alternative address by, for example, initiating a request, look-up, or query to an external entity that may, but need not, be located in the destination home network 120. The target entity 134 may then receive a response that contains the formerly included originating address and/or destination address. A local set of data at the target entity 134 may contain previously configured or cached data from a request, look-up, or query.

The formerly included address that was exchanged for the alternative address in the above procedures will be referred to hereinafter as the real address. The real address may be included in an alternative location, information element, parameter, AVP, or header in different ways, depending on the messaging protocol.

For MAP messaging and NAS signaling, the MAP-MT-Forward-SM request/indication message (and any equivalent message in Diameter such as MT-Forward-Short-Message-Request) and the RP-MT-DATA in the NAS signaling may be extended to include new, specific fields for the real address. An example of encoding in the MAP protocol for messages #3a 160*a*, #3b 160*b*, and #3c 160*c* of FIG. 1 is provided in Example #11 below. An example of encoding in the NAS signaling protocol for message #3d 160*d* of FIG. 1 is provided in Example #12 below.

For SIP messaging, the real address may be included in a P-Called-Party-ID SIP header in a SIP Method (e.g., the SIP MESSAGE method) or in a Target SIP URI parameter in a SIP Method (e.g., the SIP MESSAGE method). Alternatively, the real address may be included in an XML document in the body of a SIP Method (e.g., the SIP MESSAGE method). Examples of encoding in the SIP protocol for messages #3a 160*a*, #3b 160*b*, #3c 160*c*, and #3d 160*d* of FIG. 1 are provided in Example #13 below.

Example #11

| MT-ForwardSM-Arg ::= SEQUENCE { | | |
|---|---|---|
| sm-RP-DA | SM-RP-DA, | |
| sm-RP-OA | SM-RP-OA, | |
| sm-RP-UI | SignalInfo, | |
| moreMessagesToSend | NULL | OPTIONAL, |
| extensionContainer | ExtensionContainer | OPTIONAL, |
| ..., | | |
| smDeliveryTimer | SM-DeliveryTimerValue | OPTIONAL, |
| smDeliveryStartTime | Time | OPTIONAL, |
| real-sm-TP-OA | Alphanumeric-SM-AddressField | OPTIONAL, |
| real-sm-TP-DA | Alphanumeric-SM-AddressField | OPTIONAL } |
| -- SM-DeliveryTimerValue contains the value used by the SMS-GMSC | | |
| Alphanumeric-SM-AddressField ::= CHOICE { | | |
| fqdn | [0] FQDN, | |
| uriAddress | [1] URI, | |
| ipv4address | [2] PDP-address, | |
| ipv6address | [3] PDP-address, | |
| naiAddresss | [5] NAI} | |

Similar enhancements may be made to the other protocols listed in Tables 1a through 1e, with similar messaging and information elements.

Example #12

9.3.2.2 RP-MT-DATA
Basic elements of the RP-MT-DATA type.

| Abbr. | Reference | P[1] | Description |
|---|---|---|---|
| RP-PRI | RP-Priority-Request | +-- | Parameter indicating whether or not the short message transfer should be stopped if the originator SC address is already contained in the MWD. |
| RP-MMS | RP-More-Messages-To-Send | ○○- | Parameter indicating that there are more messages waiting in the SC |
| RP-OA | RP-Originating-Address | +++ | Address of the originating SC. |
| RP-DA | RP-Destination-Address | ++- | Address of the destination MS. |
| RP-UD | RP-User-Data | +++ | Parameter containing the TPDU |
| RP-MTI | RP-Message Type Indicator | ○-- | Parameter indicating if the TPDU is a SMS Deliver or a SMS Status Report[2] |
| RP-SMEA | RP-originating SME-Address | ○-- | Address of the originating SME[2] |
| RP-R-TP-OA | RP-RealTP-OA | --○ | Real originating address of the SM when the RP-OA contains an alternative/temporary/dummy address |
| RP-R-TP-DA | RP-RealTP-DA | --○ | Real destination address of the SM when the RP-DA contains an alternative/temporary/dummy address |

[1]Provision on the links SC<->MSC, MSC<->MSC or MSC<->SGSN, and MSC<->MS or SGSN<-> MS indicated by "xxx", where x may be "+", "-" or "○", dependent on whether the parameter is mandatory, not present or optional on the respective link.
[2]These information elements may be included in the "Send Routing Information for SM" sent by the SMS-GMSC to the HLR. When transmitted, the RP-SMEA shall take the TP-OA value. When transmitted, the RP-MTI shall be given the following values: 0 SMS Deliver. 1 SMS Status Report. This may be used by the HLR to distinguish the two cases in order not to apply any filtering mechanism based on the RP-SMEA value in case of a SMS-Status Report transmission.

Example #13

SIP Header—Utilizing the P-Called-Party-ID SIP Header

```
MESSAGE sip:[5555::aaa:bbb:ccc:ddd]:1357;comp=sigcomp SIP/2.0
Via: SIP/2.0/UDP pcscf2.visited2.net;branch=z9hG4bK2524fd2,
     SIP/2.0/UDP scscf2.home2.net;branch=z9hG4bK344a651,
     SIP/2.0/UDP ipsmgw.home2.net;branch=z9hG4bK876ffa3
Max-Forwards: 68
From: <sip:ipsmgw.home2.net>; tag=583558
To: <sip:user2_public2@home2.net>
Call-ID: fy365h43g3f36f3f6fth74g3
Cseq: 888 MESSAGE
P-Called-Party-ID: <sip:m2m_public2@home2.net>
Request-Disposition: no-fork
Accept-Contact: *;+g.3gpp.smsip;require;explicit
Content-Type: application/vnd.3gpp.sms
Content-Length: (...)
```

SIP Header—Utilizing the "Target" SIP URI Parameter

TABLE B.6-1

MESSAGE request (IP-SM-GW to S-CSCF)

```
MESSAGE sip:[5555::aaa:bbb:ccc:ddd]:1357; target=m2m@home2.net
SIP/2.0
Via: SIP/2.0/UDP ipsmgw.home2.net; branch=z9hG4bK876ffa3
Max-Forwards: 70
Route: <sip:scscf1.home2.net;lr>
From: <sip:ipsmgw.home2.net>; tag=583558
To: <sip:user2_public2@home2.net>
Call-ID: fy365h43g3f36f3f6fth74g3
Cseq: 888 MESSAGE
P-Asserted-Identity: sip:ipsmgw.home2.net
Request-Disposition: no-fork
Accept-Contact: *;+g.3gpp.smsip;require;explicit
```

TABLE B.6-1-continued

MESSAGE request (IP-SM-GW to S-CSCF)

```
Content-Type: application/vnd.3gpp.sms
Content-Length: (...)
```

Figure 6:
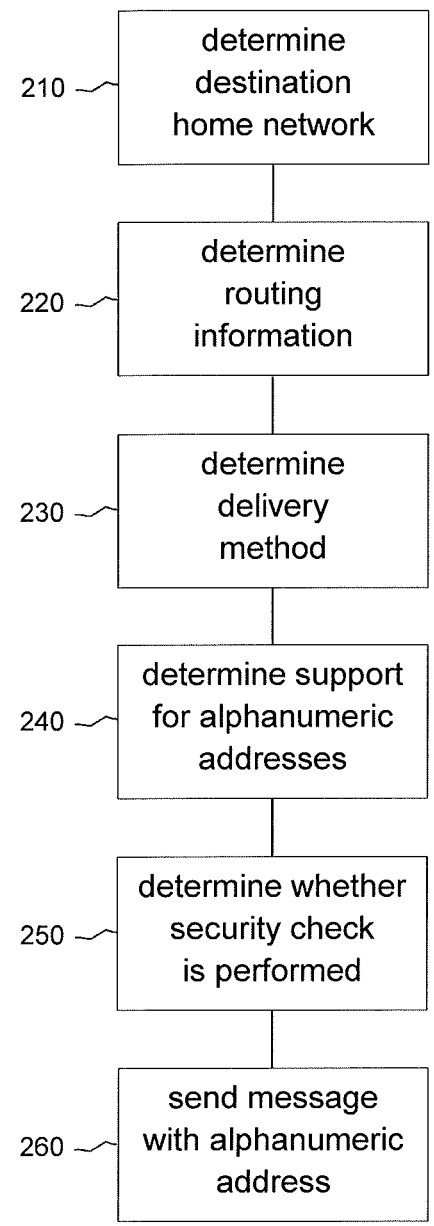
FIG. 6 illustrates a procedure for sending an SMS message to a target entity that has an alphanumeric address according to one embodiment.

FIG. 6 summarizes the procedures described above for sending an SMS message to a target entity that has an alphanumeric address. All of the procedures described could be performed, or various portions of the procedures could be performed in various combinations with one another, or the procedures could be performed individually with none of the other procedures being performed. At block 210, a sending entity determines a routable address for an entity in a destination home network based on an alphanumeric address of a target entity of an SMS message. More specifically, the alphanumeric address is a not an MSISDN address. The sending entity then sends the entity in the destination home network a query message requesting routing information to the target entity. At block 220, the entity in the destination home network determines the routing information and provides the routing information to the sending entity. The sending entity may then send the entity in the destination home network a query message requesting a preferred delivery method for the SMS message. Alternatively, a single query message could be sent that requests both the routing information and the preferred delivery method. At block 230, the entity in the destination home network determines the preferred delivery method and provides the preferred delivery method to the sending entity. At block 240, the entity in the destination home network determines whether an entity in a destination serving network supports non-MSISDN addresses. At block 250, the entity in the destination home network determines whether the entity in the destination serving network performs a security check on addresses in received messages. At block 260, if the entity in the destination serving network supports non-MSISDN addresses and if the entity in the destination serving network does not perform the security check, the sending entity sends the SMS message to the target entity using the alphanumeric address as the address for the target entity, using the routing information, and using the preferred delivery method.

Figure 7:
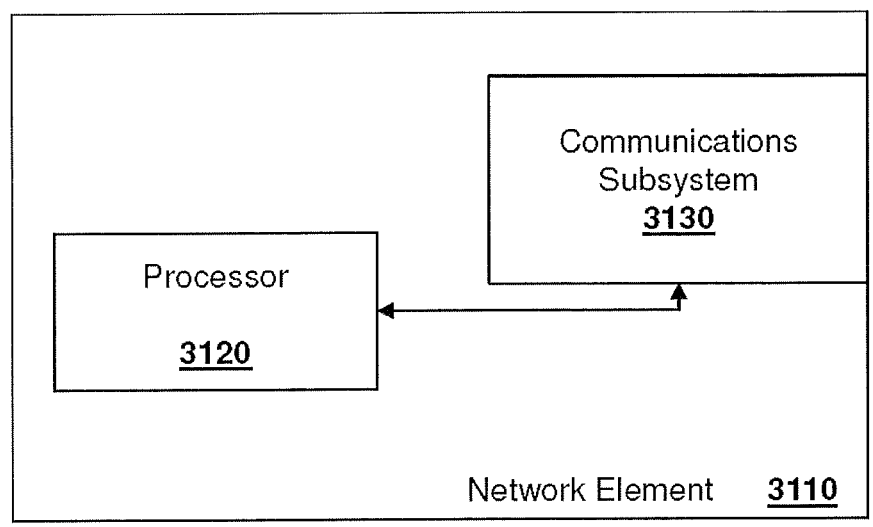
FIG. 7 is a simplified block diagram of an exemplary network element according to one embodiment.

The concepts described above may be implemented by a network element. A simplified network element is shown with regard to FIG. 7. In FIG. 7, network element 3110 includes a processor 3120 and a communications subsystem 3130, where the processor 3120 and communications subsystem 3130 cooperate to perform the methods described above.

Figure 8:
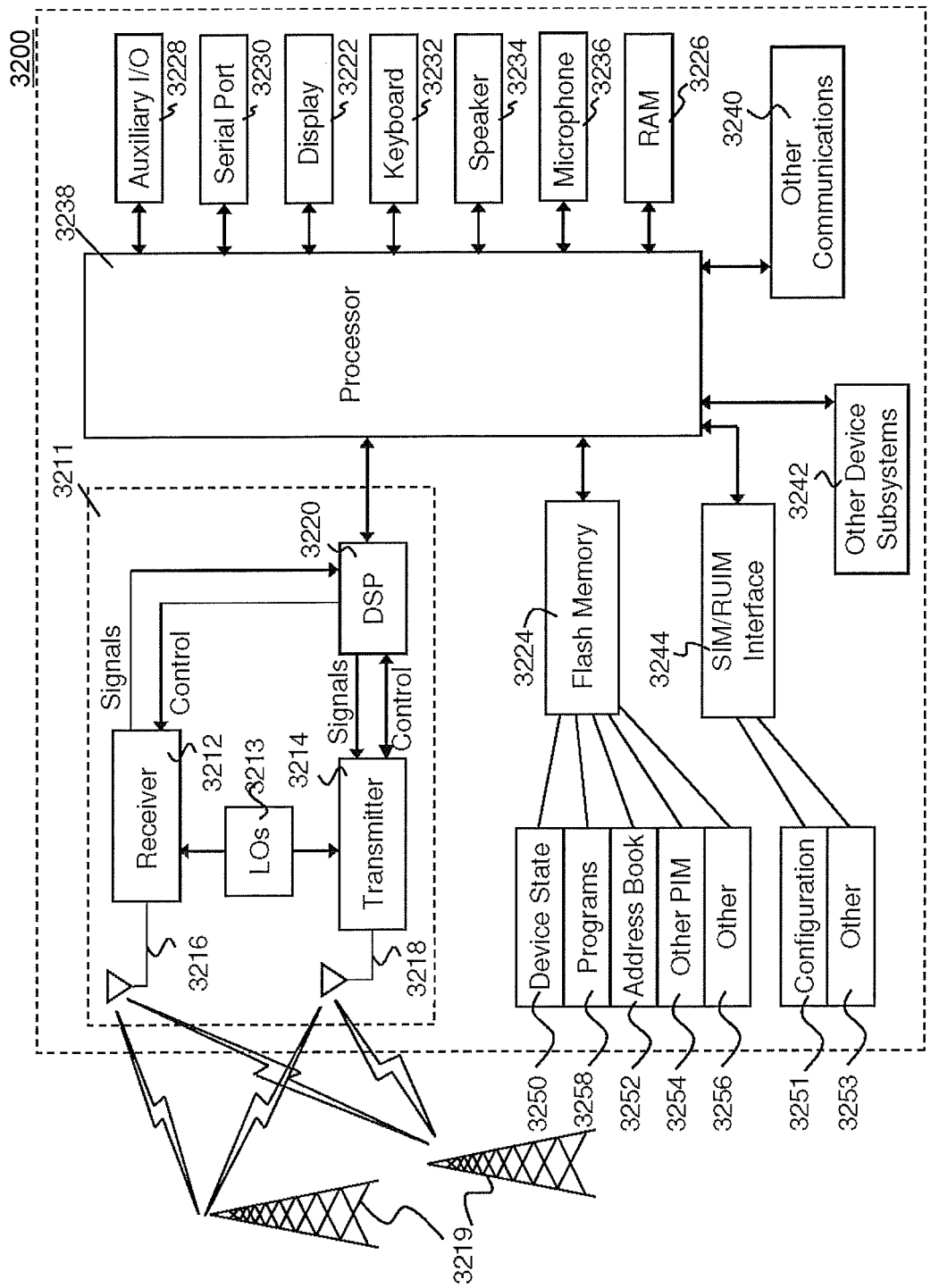
FIG. 8 is a block diagram with an example user equipment capable of being used with the systems and methods in the embodiments described herein.

Further, the above may be implemented by a UE. One exemplary device is described below with regard to FIG. 8. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 9:
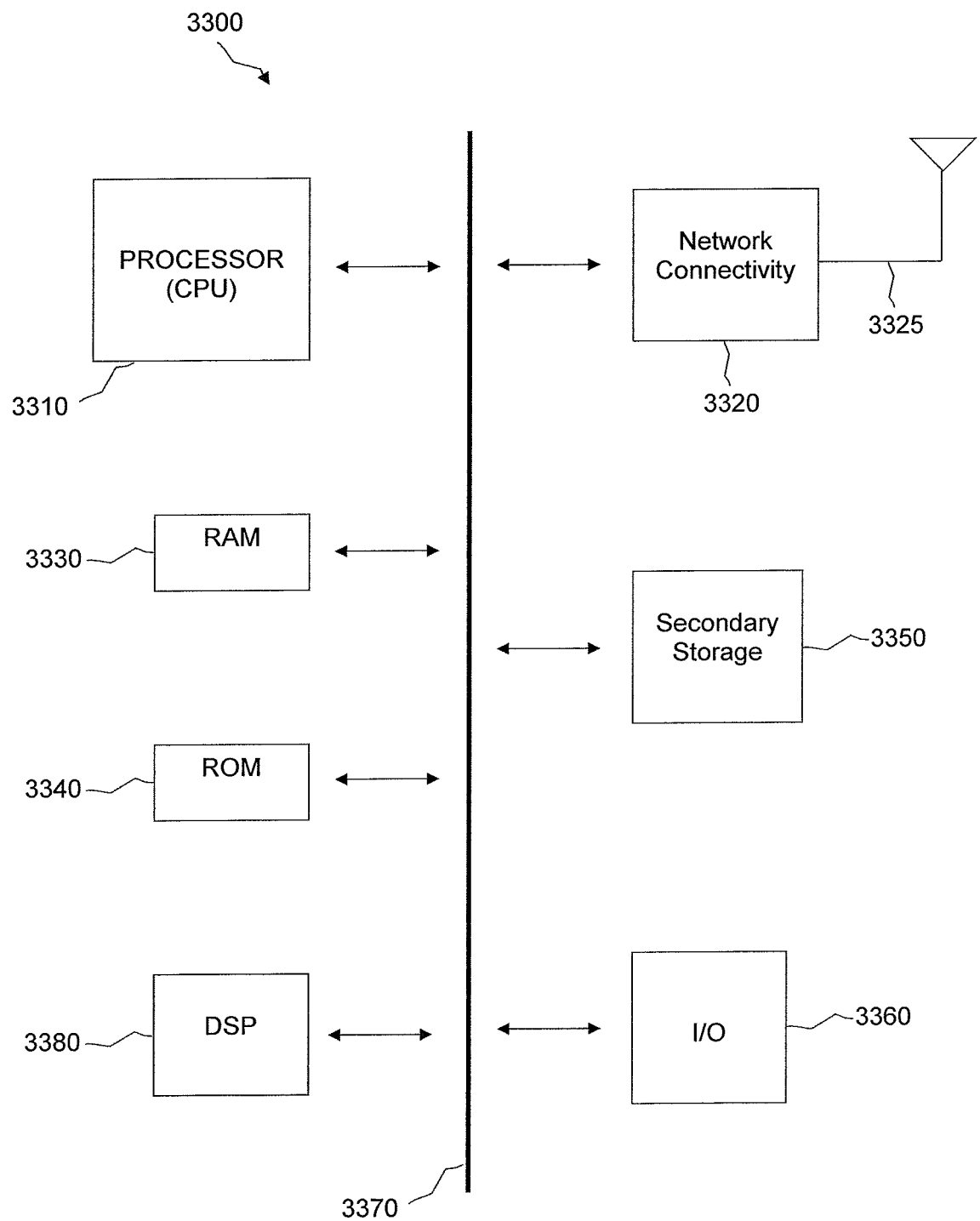
FIG. 9 illustrates a processor and related components suitable for implementing the several embodiments of the present disclosure.

The UE and other components described above might include a processing component that is capable of executing instructions related to the actions described above. FIG. 9 illustrates an example of a system 3300 that includes a processing component 3310 suitable for implementing one or more embodiments disclosed herein. The processing component 3310 may be substantially similar to the processor 3120 of FIG. 7 and/or the processor 3238 of FIG. 8.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for sending an SMS message is provided. The method comprises determining, by a sending network entity, a destination home network associated with a target entity for the SMS message, wherein an address of the target entity is an identifier other than an MSISDN number. The target entity address may be one of: a URI, a URL, an NAI, an IP address, or a character string other than an MSISDN, a URI, a URL, an NAI, or an IP address. The sending network entity may use the target entity address to obtain a domain name associated with the destination home network. When the target entity address is a URI, URL, or NAI, the sending network entity may obtain the domain name by extracting a string of characters from the URI, URL, or NAI starting at the first character after an @ symbol in the URI, URL, or NAI and continuing to the last character in the URI, URL, or NAI. When no @ symbol is present in the URI, URL, or NAI, the sending network entity may assume a default domain name. When the target entity address is an IP address, the sending network entity may obtain the domain name by performing a reverse domain name look-up to retrieve the domain name associated with the IP address. When the target entity address is a character string other than an MSISDN, a URI, a URL, an NAI, or an IP address, the sending network entity may obtain the domain name by performing a database look-up on at least a portion of the character string to retrieve address information associated with the character string. When the database look-up returns a URI, a URL, or an NAI, the sending network entity may obtain the domain name by extracting a string of characters from the URI, URL, or NAI starting at the first character after an @ symbol in the URI, URL, or NAI and continuing to the last character in the URI, URL, or NAI, and when the database look-up returns an IP address, the sending network entity may obtain the domain name by performing a reverse domain name look-up to retrieve the domain name associated with the IP address. The sending network entity may use the domain name associated with the destination home network to determine a routable address of a database entity within the destination home network. The sending network entity may determine the routable address of the database entity by applying a previously established prefix to the domain name to form a fully qualified domain name and by performing a look-up on the fully qualified domain name to resolve the fully qualified domain name to an IP address. The sending network entity may determine the routable address of the database entity by performing a look-up on the domain name to find a fully qualified domain name or IP address associated with the database entity. After determining the routable address of the database entity, the sending network entity may send the database entity a query message requesting routing information to the target entity, wherein the query message includes an information element that contains the target entity address. The sending network entity may receive, from the database entity in response to the query message, a response message containing the routing information, the routing information having been obtained by the database entity through a query to a database that stores the routing information associated with the target entity address. When the information element is included in the query message in addition to the MSISDN, the query message may include an indicator indicating that the MSISDN is to be ignored and that the target entity address is to be used for routing the SMS message to the target entity. When the information element is included in the query message instead of the MSISDN, a choice between the MSISDN and the target entity address may be provided at the sending network entity by an increase in an application context version associated with the query message. Information regarding a preferred delivery method for the SMS message may be included in the response message.

In another embodiment, a method for sending an SMS message is provided. The method comprises receiving, by a destination home network database entity from a sending network entity, a query message requesting routing information to a target entity for the SMS message, wherein the query message includes an information element that contains a target entity address other than an MSISDN number. The target entity address may be one of: a URI, a URL, an NAI, or an IP address. The routing information may be one of: an IMSI of the target entity, an identity of a destination serving network entity on which the target entity is residing, or an identity of a destination home network proxy entity through which the SMS message will pass. The destination home network database entity may send to the sending network entity, in response to the query message, a response message containing the routing information, the routing information having been obtained by the destination home network database entity through a query to a database that stores the routing information associated with the target entity address. When the information element is included in the query message in addition to the MSISDN, the query message may include an indicator indicating that the MSISDN is to be ignored and that the target entity address is to be used for routing the SMS message to the target entity. The indicator may be at least one of: a value in the information element, a value in the query message outside the information element, or implied by the presence of an information element that contains the target entity address. When the information element is included in the query message instead of the MSISDN, a choice between the MSISDN and the target entity address may be provided at the sending network entity by an increase in an application context version associated with the query message.

In another embodiment, a method for sending an SMS message is provided. The method comprises receiving, by a destination home network database entity from a sending network entity, a first message containing an indication of support for a plurality of SMS message delivery protocols, wherein the SMS message is transmitted to a target entity address contained in the first message.

In another embodiment, a destination home network database entity is provided. The destination home network database entity comprises a processor configured such that the destination home network database entity receives, from a sending network entity, a first message containing an indication of support for a plurality of SMS message delivery protocols, wherein the SMS message is transmitted to a target entity address contained in the first message.

In another embodiment, a method for communication is provided. The method comprises including, by a sending network entity, in an SMS message intended for a target entity, an alphanumeric address as an originating address of the SMS message, wherein the alphanumeric address is addressable by the target entity, and wherein the alphanumeric address is an identifier other than an MSISDN number.

In another embodiment, a sending network entity is provided. The sending network entity comprises a processor configured such that the sending network entity includes, in an SMS message intended for a target entity, an alphanumeric address as an originating address of the SMS message, wherein the alphanumeric address is addressable by the target entity, and wherein the alphanumeric address is an identifier other than an MSISDN number.

The following are incorporated herein by reference for all purposes: 3GPP TS 23.003, 3GPP TS 23.038, 3GPP TS 23.040, 3GPP TS 29.002, 3GPP TS 23.078, 3GPP TS 29.078, 3GPP TS 29.172, 3GPP TS 29.229, 3GPP TS 29.272, 3GPP TS 29.329, IETF RFC 2317, IETF RFC 2865, IETF RFC 2866, IETF RFC 3261, IETF RFC 3428, IETF RFC 3588, IETF RFC 3589, IETF RFC 3596, IETF RFC 4005, and IETF RFC 4740.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for sending a short message service (SMS) message, the method comprising:
   receiving, by a destination home network database entity from a sending network entity, a Diameter protocol request message identifying a target device, the Diameter protocol request message comprising a Diameter Send-Routing-Info-for-SM-Request command requesting a delivery protocol to deliver the SMS message to the target device identified in the Diameter protocol request message;
   using the Diameter Send-Routing-Info-for-SM-Request command to identify, by the destination home network database entity responsive to receiving the Diameter protocol request message, a plurality of distinct addresses for communicating the SMS message from the sending network entity to the target device, the plurality of distinct addresses conveying a plurality of respective distinct delivery protocols for transmitting the SMS message to the target device; and
   providing, by the destination home network database entity, to the sending network entity, in response to identifying the plurality of distinct addresses, a list comprising the plurality of distinct addresses and the plurality of distinct delivery protocols conveyed by the plurality of distinct addresses, respectively, each of the plurality of distinct addresses being directed to the target device, wherein the destination home network database entity is a Home Location Register (HLR) or a Home Subscriber Server (HSS).

2. The method of claim 1, wherein the plurality of distinct addresses comprises at least one of a uniform resource identifier (URI), a uniform resource locator (URL), a Network Access Identifier (NAI), an IPv4 address, or an IPv6 address.

3. The method of claim 1, wherein the respective distinct delivery protocols include at least one of:
   mobile application part (MAP) protocol;
   short message point-to-point protocol (SMPP);
   remote authentication dial-in user service (RADIUS) protocol;
   Diameter protocol; or
   session initiation protocol (SIP).

4. The method of claim 1, wherein at least one of the distinct delivery addresses is identified based on at least two of:
   a source address of the Diameter protocol request message;
   a status of a memory in the target device for receiving or storing SMS messages; or
   a current location of the target device.

5. The method of claim 4, wherein the current location is based on at least one of: a cell identity, a mobile country code (MCC), a mobile network code (MNC), or a way point associated with the target device.

6. The method of claim 1, wherein the list lists the plurality of distinct delivery addresses in a prioritized order.

7. The method of claim 6, wherein the sending network entity is configured to transmit the SMS message using an SMS message delivery protocol having a highest priority among the distinct delivery protocols, wherein the SMS message delivery protocol having the highest priority is based on the prioritized order.

8. The method of claim 6, wherein the sending network entity is configured to attempt transmitting the SMS message to the target entity using a first delivery protocol conveyed by a first destination address before attempting to transmit the SMS message to the target entity using a second delivery protocol conveyed by a second destination address having a lower priority than the first destination address, wherein the first destination address and the second destination address are selected from the plurality of distinct addresses in the list.

9. The method of claim 1, further comprising transmitting, from the from sending network entity to the target entity, the SMS message using a first delivery protocol conveyed by a first destination address selected from the plurality of distinct addresses, wherein the sending network entity is configured such that if the target entity fails to receive the SMS message transmitted using the first delivery protocol, the sending entity transmits the SMS message to the target entity using a second delivery protocol conveyed by a second destination address selected from the plurality of distinct addresses.

10. The method of claim 1, wherein providing the list further comprises providing an indication to the sending network entity that at least one of the distinct delivery protocols for transmitting the SMS message is only applicable to the target device for a certain time.

11. The method of claim 1, wherein providing the list further comprises providing routing information to the sending network entity, the routing information identifying one or more components that serve as intermediary hops along a path between the sending network entity and the target device.

12. The method of claim 1, wherein the destination home network database entity provides the list to the sending network entity via a Diameter protocol response message.

13. The method of claim 1, wherein the Diameter protocol request message further comprises a destination address of the target device, the destination address containing a Nature of Address Indicator field.

14. A destination home network database entity comprising:
   a processor configured such that the destination home network database entity:
      receives, from a sending network entity, a Diameter protocol request message identifying a target device, the Diameter protocol request message comprising a Diameter Send-Routing-Info-for-SM-Request command request a delivery protocol to deliver a short message service (SMS) message to the target device identified in the Diameter protocol request message, identifies, using the Diameter Send-Routing-Info-for-SM-Request command, a plurality of distinct addresses for communicating the SMS message from the sending network entity to the target device, the plurality of distinct addresses conveying a plurality of respective distinct delivery protocols for transmitting the SMS message to the target device, and provides, to the sending network entity, in response to identifying the plurality of distinct addresses, a list comprising the plurality of distinct addresses and the plurality of distinct delivery protocols conveyed by the plurality of distinct addresses, respectively, each of the plurality of distinct addresses being directed to the target device, wherein the destination home network database entity is a Home Location Register (HLR) or a Home Subscriber Server (HSS).

15. The destination home network database entity of claim 14, wherein the plurality of distinct delivery addresses comprises a uniform resource identifier (URI).

16. The destination home network database entity of claim 14, wherein the respective distinct delivery protocols include at least one of:
mobile application part (MAP) protocol;
short message point-to-point protocol (SMPP);
remote authentication dial-in user service (RADIUS) protocol;
Diameter protocol; or
session initiation protocol (SIP).

17. The destination home network database entity of claim 14, wherein at least one of the distinct delivery addresses is identified based on a status of a memory in the target device for receiving or storing SMS messages and at least one of:
a source address of the Diameter protocol request message; or
a current location of the target device.

18. The destination home network database entity of claim 17, wherein the current location is based on at least one of: a cell identity, a mobile country code (MCC), a mobile network code (MNC), or a way point associated with the target device.

19. The destination home network database entity of claim 14, wherein the list lists the plurality of distinct delivery addresses in a prioritized order.

20. The destination home network database entity of claim 19, wherein the sending network entity is configured to transmit the SMS message using an SMS message delivery protocol having a highest priority among the distinct delivery protocols, wherein the SMS message delivery protocol having the highest priority is based on the prioritized order.

21. A non-transitory computer medium storing computer readable instructions, the computer readable instructions adapted to be executed by a processor to implement a method for sending a short message service (SMS) message, the method comprising:
receiving, by a destination home network database entity from a sending network entity, a Diameter protocol request message identifying a target device, the Diameter protocol request message comprising a Diameter Send-Routing-Info-for-SM-Request command request a delivery protocol to deliver the SMS message to the target device identified in the Diameter protocol request message;
using the Diameter Send-Routing-Info-for-SM-Request command to identify, by the destination home network database entity responsive to receiving the Diameter protocol request message, a plurality of distinct addresses for communicating the SMS message from the sending network entity to the target device, the plurality of distinct addresses conveying a plurality of respective distinct delivery protocols for transmitting the SMS message to the target device; and
providing, by the destination home network database entity, to the sending network entity, in response to identifying the plurality of distinct addresses, a list comprising the plurality of distinct addresses and the plurality of distinct delivery protocols conveyed by the plurality of distinct addresses, respectively, each of the plurality of distinct addresses being directed to the target entity, wherein the destination home network database entity is a Home Location Register (HLR) or a Home Subscriber Server (HSS).

\* \* \* \* \*